(12) United States Patent
Zhu et al.

(10) Patent No.: US 11,419,010 B2
(45) Date of Patent: Aug. 16, 2022

(54) INFORMATION TRANSMISSION METHOD AND APPARATUS

(71) Applicant: HUAWEI TECHNOLOGIES CO., LTD., Guangdong (CN)

(72) Inventors: Yuanping Zhu, Shanghai (CN); Mingzeng Dai, Shenzhen (CN); Xiaoli Shi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 45 days.

(21) Appl. No.: 17/029,986

(22) Filed: Sep. 23, 2020

(65) Prior Publication Data

US 2021/0007011 A1 Jan. 7, 2021

Related U.S. Application Data

(63) Continuation of application No. PCT/CN2019/079591, filed on Mar. 25, 2019.

(30) Foreign Application Priority Data

Mar. 26, 2018 (CN) .......................... 201810254395.6

(51) Int. Cl.
*H04W 28/12* (2009.01)
*H04B 17/40* (2015.01)
*H04B 7/155* (2006.01)

(52) U.S. Cl.
CPC ........ *H04W 28/12* (2013.01); *H04B 7/15542* (2013.01); *H04B 17/40* (2015.01)

(58) Field of Classification Search
CPC . H04W 28/12; H04W 28/0278; H04W 24/02; H04W 72/1284; H04W 72/0413;
(Continued)

(56) References Cited

U.S. PATENT DOCUMENTS 8,406,192 B2 * 3/2013 Cai .................. H04W 36/0033
370/315
8,576,714 B2 * 11/2013 Yang ...................... H04L 47/10
370/235
(Continued)

FOREIGN PATENT DOCUMENTS

CN 101605355 A 12/2009
CN 102045851 A 5/2011
(Continued)

OTHER PUBLICATIONS

Office Action issued in Chinese Application No. 201810254395.6 dated Nov. 20, 2020, 8 pages.
(Continued)

*Primary Examiner* — Man U Phan
(74) *Attorney, Agent, or Firm* — Fish & Richardson P.C.

(57) ABSTRACT

Example information transmission methods and apparatus are described. One example method includes determining first information by a relay node, where the first information includes at least one of the following information: a buffer status at a granularity of the relay node, a buffer status at a granularity of an RB between the relay node and at least one first node, a buffer status at a granularity of each first node in the at least one first node, and a buffer status at a granularity of an RB between each first node in the at least one first node and a child node, where the at least one first node is a child node of the relay node. A first packet that carries the first information is sent by the relay node to a second node.

18 Claims, 18 Drawing Sheets

(58) Field of Classification Search
CPC . H04W 40/22; H04W 72/14; H04W 28/0289; H04W 28/02; H04W 72/12; H04W 72/04; H04L 47/34; H04L 47/11; H04L 47/12; H04B 7/15542; H04B 17/40; H04B 7/15528; H04B 7/155
USPC .......................................................... 370/236
See application file for complete search history.

(56) References Cited

U.S. PATENT DOCUMENTS

| | | | | |
|---|---|---|---|---|
| 8,619,664 | B2* | 12/2013 | Takahashi | H04W 76/12 455/450 |
| 8,687,590 | B2* | 4/2014 | Cai | H04W 36/0033 370/335 |
| 9,077,430 | B2* | 7/2015 | Han | H04B 7/155 |
| 9,113,455 | B2* | 8/2015 | Chen | H04W 4/60 |
| 9,282,565 | B2* | 3/2016 | Mildh | H04W 56/0045 |
| 9,781,654 | B2* | 10/2017 | Wang | H04W 40/22 |
| 10,420,010 | B2* | 9/2019 | Wang | H04W 72/0446 |
| 11,075,687 | B2* | 7/2021 | Zhu | H04W 16/26 |
| 11,076,340 | B2* | 7/2021 | Wang | H04W 16/26 |
| 2012/0287790 | A1* | 11/2012 | Huang | H04W 28/10 370/236 |
| 2020/0252847 | A1* | 8/2020 | Park | H04W 76/27 |
| 2020/0287615 | A1* | 9/2020 | Zhu | H04B 7/155 |
| 2020/0344666 | A1* | 10/2020 | Wang | H04L 69/326 |
| 2020/0351854 | A1* | 11/2020 | Wang | H04W 72/0406 |
| 2021/0022040 | A1* | 1/2021 | Zhu | H04L 1/22 |
| 2021/0168666 | A1* | 6/2021 | Li | H04W 76/18 |
| 2021/0176658 | A1* | 6/2021 | Wang | H04W 84/047 |
| 2021/0298000 | A1* | 9/2021 | Park | H04W 56/001 |
| 2021/0377787 | A1* | 12/2021 | Zhuo | H04W 72/14 |

FOREIGN PATENT DOCUMENTS

| | | |
|---|---|---|
| CN | 102056242 A | 5/2011 |
| CN | 102448058 A | 5/2012 |
| CN | 102598821 A | 7/2012 |
| CN | 102958122 A | 3/2013 |
| CN | 103098507 A | 5/2013 |
| CN | 106034314 A | 10/2016 |
| CN | 107580330 A | 1/2018 |
| WO | 2011123549 A1 | 10/2011 |

OTHER PUBLICATIONS

PCT International Search Report and Written Opinion issued in International Application No. PCT/CN2019/079591 dated May 29, 2019, 17 pages (with English translation).

Extended European Search Report issued in European Application No. 19775569.7 dated Apr. 1, 2021, 9 pages.

* cited by examiner

INFORMATION TRANSMISSION METHOD AND APPARATUS

CROSS-REFERENCE TO RELATED APPLICATIONS

This application is a continuation of International Application No. PCT/CN2019/079591, filed on Mar. 25, 2019, which claims priority to Chinese Patent Application No. 201810254395.6, filed on Mar. 26, 2018. The disclosures of the aforementioned applications are hereby incorporated by reference in their entireties.

TECHNICAL FIELD

This application relates to the field of communications technologies, and in particular, to an information transmission method and apparatus.

BACKGROUND

To meet an ultra-high capacity requirement in a fifth generation (5G) system, a high-frequency carrier that is eagerly concerned because the high-frequency carrier has more abundant frequency resources than a low-frequency carrier is selected as a main operating frequency band of the 5G system. The high-frequency carrier has a poor propagation characteristic, is severely attenuated if blocked, and has a small coverage area. Consequently, a large quantity of small cells need to be densely deployed in a hotspot area. Correspondingly, costs of providing optical fiber backhaul for the large quantity of densely deployed small cells are high, and optical fiber deployment is difficult. To resolve the foregoing problems, an integrated access and backhaul (IAB) technology in which a wireless relay is introduced provides an idea: In the integrated access and backhaul technology, a wireless transmission solution is used and the optical fiber deployment is avoided for each of an access link and a backhaul link.

As 5G-oriented wireless relay networking scenarios, both a multi-hop wireless relay scenario and a multi-connectivity scenario may be supported. In a multi-hop/multi-connectivity IAB networking scenario, how to design feedback information of each link, so that a node (for example, an upper-level node or a multi-link traffic distribution anchor) that can perform flow control can properly adjust flow control based on obtained feedback information is an urgent problem to be resolved.

SUMMARY

Embodiments of this application provide an information transmission method and apparatus, to implement feedback of flow control information in a multi-hop/multi-connectivity IAB networking scenario.

Specific technical solutions provided in the embodiments of this application are as follows.

According to a first aspect, an embodiment of this application provides an information transmission method, including:

determining, by a relay node, first information, where the first information includes at least one of the following information: a buffer status at a granularity of the relay node, a buffer status at a granularity of a radio bearer RB between the relay node and at least one first node, a buffer status at a granularity of each first node in the at least one first node, and a buffer status at a granularity of an RB between each first node in the at least one first node and a child node, where the at least one first node is a child node of the relay node; and sending, by the relay node, a first packet that carries the first information to a second node.

According to the method provided in this application, in a multi-hop/multi-connectivity IAB networking scenario, the relay node can send buffer statuses at different granularities of different links between the relay node and the child node of the relay node to the second node, so that the second node can properly adjust flow control of each link based on content of the first information.

In a possible design, the determining, by a relay node, first information includes the following three implementations.

A first implementation includes: monitoring, by the relay node, a buffer status of the relay node, to obtain the buffer status at the granularity of the relay node, the buffer status at the granularity of the radio bearer RB between the relay node and the at least one first node, and the buffer status at the granularity of each first node in the at least one first node.

A second implementation includes: receiving, by the relay node, a second packet sent by the at least one first node, to obtain the buffer status at the granularity of each first node in the at least one first node and the buffer status at the granularity of the RB between each first node in the at least one first node and the child node from the second packet.

A third implementation includes: monitoring, by the relay node, a buffer status of the relay node, and receiving a buffer status sent by the at least one first node, to obtain the buffer status at the granularity of the relay node, the buffer status at the granularity of the radio bearer RB between the relay node and the at least one first node, the buffer status at the granularity of each first node in the at least one first node, and the buffer status at the granularity of the RB between each first node in the at least one first node and the child node.

In the foregoing design, content of the first information determined by the relay node varies in the different implementations, to flexibly adapt different flow control policies of the destination node.

In a possible design, the first packet further includes first indication information, used to indicate that the first packet is a packet including flow control feedback information.

In a possible design, where before the sending, by the relay node, a first packet to the second node, the method further includes: determining, by the relay node based on the first indication information or a destination address carried in the second packet, that the second node is a destination node that receives the first packet.

In the foregoing design, the relay node can determine, based on a service type or a destination address, that the second node is the destination node, to ensure that the first packet including the first information can be accurately sent to the destination node.

In a possible design, the first information further includes at least one of a buffer status at a granularity of a DRB of a terminal, a buffer status at a granularity of the terminal, a buffer status at a granularity of a protocol data unit PDU session of the terminal, a buffer status at a granularity of a quality of service flow of the terminal, a link status indication of a link between the relay node and the at least one first node, a sequence number of a data packet successfully sent to the first node or the terminal, a sequence number of a data packet that the relay node determines to be lost or that is not fed back to the second node, link quality information of the link between the relay node and the at least one first node, a bandwidth or a transmission rate at the granularity of the relay node, a bandwidth or a transmission rate at the granularity of the terminal, a bandwidth or a transmission rate at the granularity of the RB of the terminal, a bandwidth or a transmission rate at the granularity of the PDU session of the terminal, a bandwidth or a transmission rate at the granularity of the quality of service flow of the terminal, an average or minimum transmission delay of the link between the relay node and the at least one first node, an average wait time or a minimum wait time of data packets at the relay node, and a load degree indication of the relay node.

In the foregoing design, the first information may further include various information about the link between the relay node and the at least one first node. In this way, the second node can perform flow control on different links by integrating various link information, to prevent a link congestion state from occurring.

In a possible design, the sending, by the relay node, a first packet that carries the first information to the second node includes the following two cases.

A first case includes: periodically sending, by the relay node, the first packet to the second node.

A second case includes: sending, by the relay node, the first packet to the second node when a preset event is triggered.

In a possible design, the first packet is sent on a peer GTP layer, a peer adaptation layer, or a peer control layer between the relay node and the second node.

In the foregoing design, different sending manners of the first packet are applicable to different protocol stack architectures.

In a possible design, the sequence number of the data packet that the relay node determines to be lost or that is not fed back to the second node belongs to sequence numbers that can be identified at both the second node and the relay node and are consecutively numbered on the link between the second node and the relay node.

According to a second aspect, an embodiment of this application provides an information transmission method, including:

determining, by a terminal, first information, where the first information includes at least one of the following information: a link status indication of an access link of the terminal, a sequence number of a data packet received by the terminal device, a sequence number of a data packet that the terminal device determines to be lost or that is not successfully received by the terminal device, link quality information of the access link of the terminal, and an average or minimum transmission delay of the access link of the terminal; and sending, by the terminal, a first packet that carries the first information to the destination node.

According to a third aspect, an embodiment of this application provides an information transmission apparatus, applied to a relay node, and including:

a processing unit, configured to determine first information, where the first information includes at least one of the following information: a buffer status at a granularity of the relay node, a buffer status at a granularity of a radio bearer RB between the relay node and at least one first node, a buffer status at a granularity of each first node in the at least one first node, and a buffer status at a granularity of an RB between each first node in the at least one first node and a child node, where the at least one first node is a child node of the relay node; and a sending unit, configured to send a first packet that carries the first information to a second node.

In a possible design, the processing unit is specifically configured to: monitor a buffer status of the relay node, to obtain the buffer status at the granularity of the relay node, the buffer status at the granularity of the radio bearer RB between the relay node and the at least one first node, and the buffer status at the granularity of each first node in the at least one first node; or receive a second packet sent by the at least one first node, to obtain the buffer status at the granularity of each first node in the at least one first node and the buffer status at the granularity of the RB between each first node in the at least one first node and the child node from the second packet; or monitor a buffer status of the relay node, and receive a buffer status sent by the at least one first node, to obtain the buffer status at the granularity of the relay node, the buffer status at the granularity of the radio bearer RB between the relay node and the at least one first node, the buffer status at the granularity of each first node in the at least one first node, and the buffer status at the granularity of the RB between each first node in the at least one first node and the child node.

In a possible design, the first packet further includes first indication information, used to indicate that the first packet is a packet including flow control feedback information.

In a possible design, the processing unit is further configured to: determine, based on the first indication information or a destination address carried in the second packet, that the second node is a destination node that receives the first packet.

In a possible design, the first information further includes at least one of a buffer status at a granularity of a DRB of a terminal, a buffer status at a granularity of the terminal, a buffer status at a granularity of a protocol data unit PDU session of the terminal, a buffer status at a granularity of a quality of service flow of the terminal, a link status indication of a link between the relay node and the at least one first node, a sequence number of a data packet successfully sent to the first node or the terminal, a sequence number of a data packet that the relay node determines to be lost or that is not fed back to the second node, link quality information of the link between the relay node and the at least one first node, a bandwidth or a transmission rate at the granularity of the relay node, a bandwidth or a transmission rate at the granularity of the terminal, a bandwidth or a transmission rate at the granularity of the RB of the terminal, a bandwidth or a transmission rate at the granularity of the PDU session of the terminal, a bandwidth or a transmission rate at the granularity of the quality of service flow of the terminal, an average or minimum transmission delay of the link between the relay node and the at least one first node, an average wait time or a minimum wait time of data packets at the relay node, and a load degree indication of the relay node.

In a possible design, the sending unit is specifically configured to: periodically send the first packet to the second node; or send the first packet to the second node when a preset event is triggered.

In a possible design, the first packet is sent on a peer GTP layer, a peer adaptation layer, or a peer control layer between the relay node and the second node.

In a possible design, the sequence number of the data packet that the relay node determines to be lost or that is not fed back to the second node belongs to sequence numbers that can be identified at both the second node and the relay node and are consecutively numbered on the link between the second node and the relay node.

According to a fourth aspect, an embodiment of this application provides an information transmission apparatus, applied to a terminal, and including:

a processing unit, configured to determine first information, where the first information includes at least one of the following information: a link status indication of an access link of the terminal, a sequence number of a data packet received by the terminal device, a sequence number of a data packet that the terminal device determines to be lost or that is not successfully received by the terminal device, link quality information of the access link of the terminal, and an average or minimum transmission delay of the access link of the terminal; and a sending unit, configured to send a first packet that carries the first information to a destination node.

According to a fifth aspect, an embodiment of this application provides a relay device. The relay device includes a transceiver, a processor, and a memory. The memory is configured to store a computer-executable instruction. The processor is configured to determine first information, where the first information includes at least one of the following information: a buffer status at a granularity of the relay device, a buffer status at a granularity of a radio bearer RB between the relay device and at least one first device, a buffer status at a granularity of each first device in the at least one first device, and a buffer status at a granularity of an RB between each first device in the at least one first device and a child device, where the at least one first device is a child device of the relay device. When the processor executes the computer-executable instruction, the transceiver is configured to send a first packet that carries the first information to a second device.

According to a sixth aspect, an embodiment of this application provides a terminal. The terminal includes a transceiver, a processor, and a memory. The memory is configured to store a computer-executable instruction. The processor is configured to determine first information, where the first information includes at least one of the following information: a link status indication of an access link of the terminal, a sequence number of a data packet received by the terminal device, a sequence number of a data packet that the terminal device determines to be lost or that is not successfully received by the terminal device, link quality information of the access link of the terminal, and an average or minimum transmission delay of the access link of the terminal. When the processor executes the computer-executable instruction, the transceiver is configured to send a first packet that carries the first information to a destination node.

According to a seventh aspect, an embodiment of this application provides a computer program product, including a computer program. When the computer program is executed on a computer unit, the computer unit is enabled to implement the method according to the first aspect and the possible designs of the first aspect.

According to an eighth aspect, an embodiment of this application provides a computer program product, including a computer program. When the computer program is executed on a computer unit, the computer unit is enabled to implement the method according to the second aspect.

According to a ninth aspect, an embodiment of this application provides a computer program. When the computer program is executed on a computer unit, the computer unit is enabled to implement the method according to the first aspect and the possible designs of the first aspect.

According to a tenth aspect, an embodiment of this application provides a computer program. When the computer program is executed on a computer unit, the computer unit is enabled to implement the method according to the second aspect.

According to an eleventh aspect, an embodiment of this application provides a computer-readable storage medium. The computer-readable storage medium stores a computer program. When the computer program is executed on a computer, the computer is enabled to implement the method according to the first aspect and the possible designs of the first aspect.

According to a twelfth aspect, an embodiment of this application provides a computer-readable storage medium. The computer-readable storage medium stores a computer program. When the computer program is executed on a computer, the computer is enabled to implement the method according to the second aspect.

According to a thirteenth aspect, an embodiment of this application provides a chip, including a processing module and a communications interface. The processing module is configured to perform the method according to the first aspect and the possible designs of the first aspect.

According to a fourteenth aspect, an embodiment of this application provides a chip, including a processing module and a communications interface. The processing module is configured to perform the method according to the second aspect.

DESCRIPTION OF EMBODIMENTS

The following clearly describes the technical solutions in the embodiments of this application with reference to the accompanying drawings in the embodiments of this application.

Figure 1:
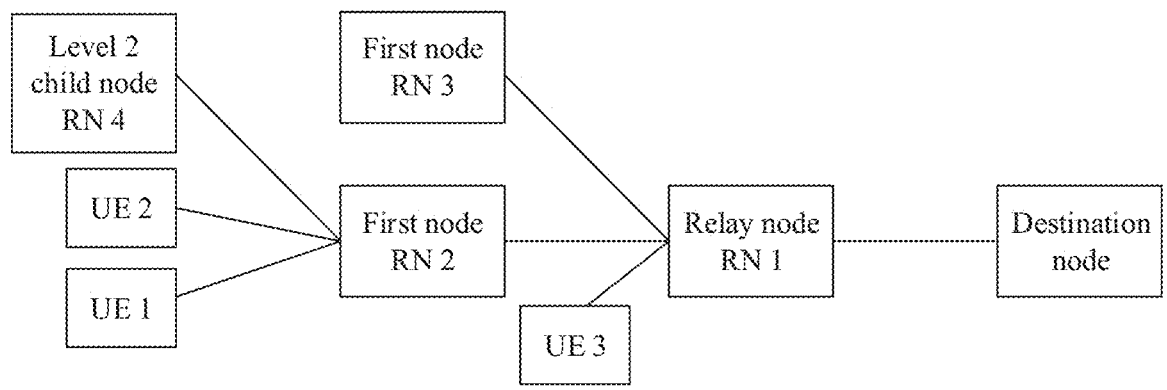
FIG. 1 is an architecture diagram of a relay network according to an embodiment of this application.

FIG. 1 is an architecture diagram of a relay network according to an embodiment of this application. Involved network elements include a terminal, a relay node, and a destination node.

The relay node (RN) is configured to receive a first packet sent by a child node or a terminal, and send the first packet to a parent node of the relay node or a traffic distribution anchor. Optionally, the first packet may be flow control feedback information. It should be understood that the relay node in this application may provide a wireless access service for the terminal device, and transmit a traffic flow of an access link through a wireless backhaul link. The relay node may also be referred to as another name, for example, an IAB node.

The destination node is a node having a flow control capability, for example, a donor base station or a parent node that is of a relay node or another relay node serving as a traffic distribution anchor, and is configured to: receive the first packet sent by the child node, a secondary node, or the terminal, and adjust a traffic distribution ratio or a sending rate at a specific granularity on each link based on content in the first packet.

It should be understood that, based on a hierarchical relationship between nodes, if a node A has an upper-level node B, the node B is referred to as a parent node of the node A; if the node A has a lower-level node C, the node C is a child node of the node A, or the node C is a secondary node of the node A. For example, in FIG. 1, UE 3 and first nodes RN 2 and RN 3 are child nodes of the relay node RN 1, and a level-2 child node RN 4 is a child node of the first node RN 2. Correspondingly, the relay node RN 1 is a parent node of the first nodes RN 2 and RN 3 and UE 3.

Traffic distribution anchor: When there are a plurality of available transmission paths between the node A and the node B, if at least two of the plurality of transmission paths are used to transmit data between the node A and the node B, for example, when the node A receives, from a plurality of transmission paths in a multi-connectivity manner, data sent from the node B, the node B may be referred to as a traffic distribution anchor.

The terminal may also be referred to as user equipment (UE) and is configured to send the first packet including flow control feedback information to an anchor of a radio resource control RRC (RRC) layer/packet data convergence protocol (PDCP) layer of the terminal. The anchor of the RRC/PDCP layer of the terminal is a node at which a peer protocol layer of the RRC/PDCP layer of the UE is located, for example, a donor base station e.g. DgNB (Donor gNB) or the relay node. The terminal in the embodiments of this application is a terminal that directly accesses the relay node or indirectly accesses the relay node through another relay node, and the relay node provides an access service for the terminal.

It should be noted that there may be a plurality of nodes (including the relay node and the donor base station) that provide an access service for the terminal, that is, the terminal may have a plurality of access links (AL), and a plurality of backhaul links (BL) may exist between the relay node and the donor base station. In addition, there may also be a plurality of relay nodes on each backhaul link, that is, the backhaul link may be a multi-hop relay link.

Embodiment 1

Figure 2:
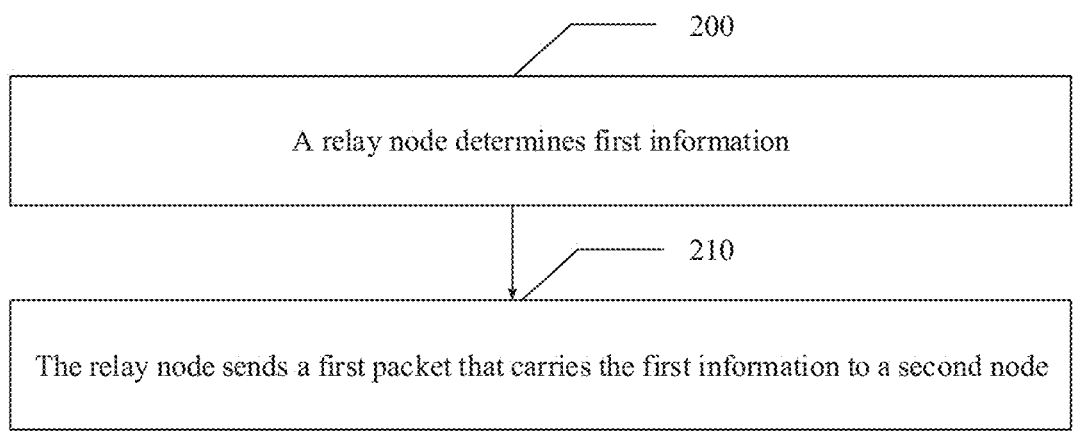
FIG. 2 is a schematic flowchart of an information transmission method according to an embodiment of this application.

Based on the schematic diagram of the relay networking architecture shown in FIG. 1, referring to FIG. 2, an embodiment of this application provides an information transmission method. A specific procedure is as follows:

Step 200: A relay node determines first information, where the first information includes at least one of the following information: a buffer status at a granularity of the relay node, a buffer status at a granularity of a radio bearer (RB) between the relay node and at least one first node, a buffer status at a granularity of each first node in the at least one first node, and a buffer status at a granularity of an RB between each first node in the at least one first node and a child node, where the at least one first node is a child node of the relay node.

Step 210: The relay node sends a first packet that carries the first information to a second node.

Specifically, in step 200, the relay node may determine the first information in the following three implementations.

In a first implementation, the relay node monitors a buffer status of the relay node, to obtain the buffer status at the granularity of the relay node, the buffer status at the granularity of the RB between the relay node and the at least one first node, and the buffer status at the granularity of each first node in the at least one first node. Optionally, a buffer status at a granularity of UE, a buffer status at a granularity of an RB of the UE, a buffer status at a granularity of a protocol data unit (PDU) session of the UE, and a buffer status at a granularity of a quality of service (QoS) flow of the UE may be further obtained. Optionally, the first information further carries an identifier specifically corresponding to each buffer status, where the identifier is used to indicate a node, a radio bearer, a PDU session, or a QoS flow that corresponds to the buffer status.

Figure 3A:
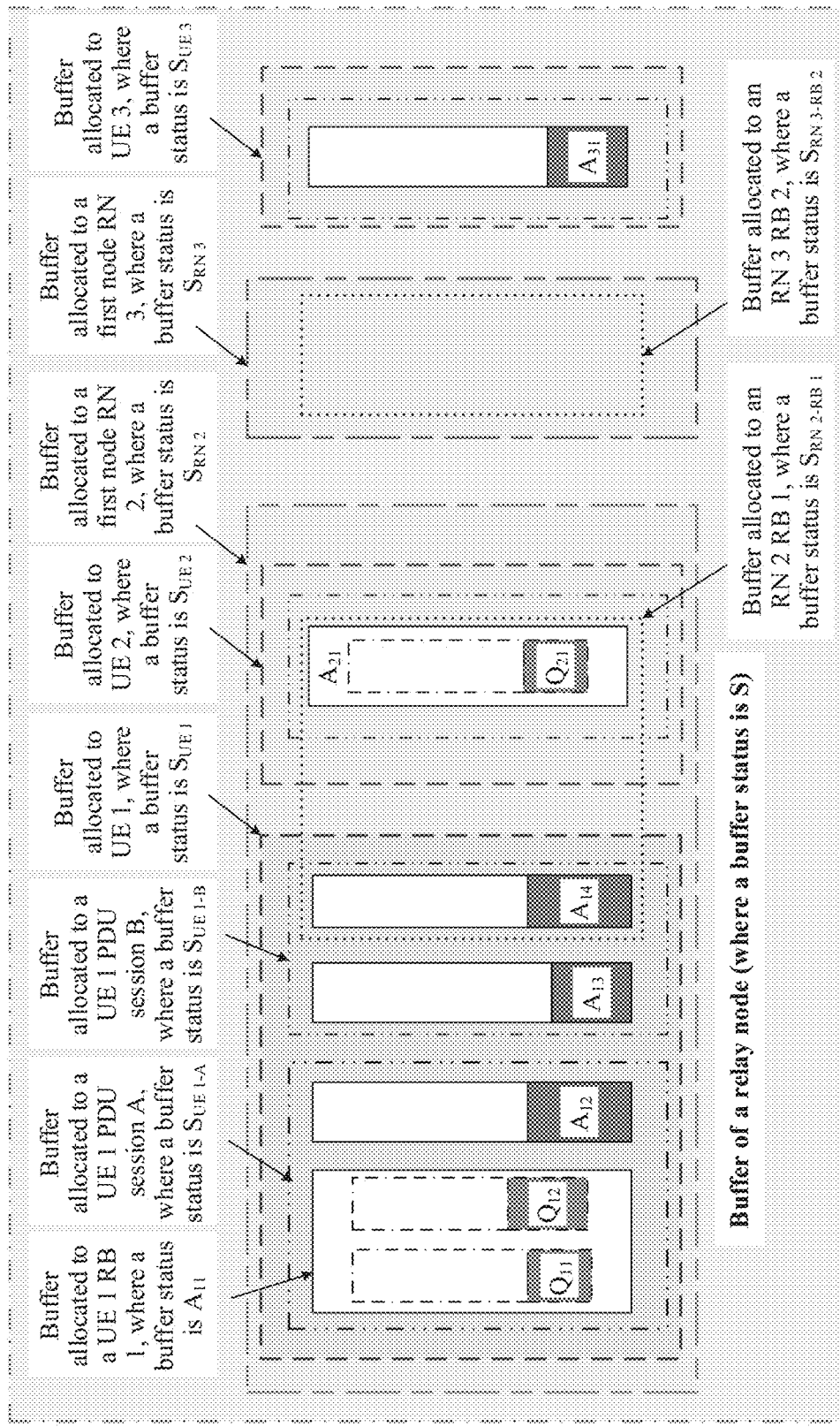
FIG. 3A and FIG. 3B are schematic diagrams of content of first information according to an embodiment of this application.

An example in which the relay node is the relay node RN 1 in FIG. 1 is used to describe in detail content of the first information in the first implementation. As shown in FIG. 3A, the first information specifically includes at least one of the following information:

(A1) a buffer status at a granularity of the relay node RN 1, for example, a total buffer status S of the relay node RN 1;

(A2) a buffer status at a granularity of a first node, specifically including, for example, a buffer status $S_{RN\ 2}$ allocated by the relay node RN 1 to an RN 2, a buffer status $S_{RN\ 3}$ allocated by the relay node RN 1 to an RN 3, and the like;

(A3) a buffer status at a granularity of an RB between the relay node RN 1 and the first node, specifically including, for example, a buffer status $S_{RN\ 2\text{-}RB\ 1}$ allocated by the relay node RN 1 to a first radio bearer between the relay node RN 1 and the RN 2 (for example, an RN 2 RB 1), a buffer status $S_{RN\ 3\text{-}RB\ 2}$ allocated by the relay node RN 1 to a second radio bearer between the relay node RN 1 and the RN 3 (for example, an RN 3 RB 2), and the like;

(A4) a buffer status at a granularity of UE, specifically including, for example, a buffer status $S_{UE\ 1}$ allocated by the relay node RN 1 to UE 1, a buffer status $S_{UE\ 2}$ allocated by the relay node RN 1 to UE 2, a buffer status $S_{UE\ 3}$ allocated by the relay node RN 1 to UE 3, and the like;

(A5) a buffer status at a granularity of a PDU session of the UE, specifically including, for example, a buffer status $S_{UE\ 1\text{-}A}$ allocated by the relay node RN 1 to a first PDU session of the UE 1 (for example, a PDU session A), a buffer status $S_{UE\ 1\text{-}B}$ allocated by the relay node RN 1 to a second PDU session of the UE 1 (for example, a PDU session B), and the like;

(A6) a buffer status at a granularity of an RB of UE, specifically including, for example, a buffer status $A_{11}$ allocated by the relay node RN 1 to a first radio bearer of UE 1 (for example, a UE 1 RB 1), a buffer status $A_{12}$ allocated by the relay node RN 1 to a second radio bearer of the UE 1 (for example, a UE 1 RB 2), a buffer status $A_{21}$ allocated by the relay node RN 1 to a first radio bearer of UE 2 (a UE 2 RB 1), a buffer status $A_{31}$ allocated by the relay node RN 1 to a first radio bearer of the UE 3 (for example, a UE 3 RB 1), and the like; and (A7) a buffer status at a granularity of a QoS flow of the UE, specifically including, for example, a buffer status $Q_{11}$ allocated by the relay node RN 1 to a first QoS flow of the UE 1 (for example, a UE 1 QoS flow 1), and a buffer status $Q_{12}$ allocated by the relay node RN 1 to a second QoS flow of the UE 1 (for example, a UE 1 QoS flow 2), a buffer status $Q_{21}$ allocated by the relay node RN 1 to a first QoS flow of the UE 2 (for example, a UE 2 QoS flow 1), and the like.

It should be noted that, optionally, the first information further carries an identifier specifically corresponding to each buffer status. For example, an identifier corresponding to the total buffer status S of the relay node RN 1 in (A1) is an identifier of the RN 1; an identifier corresponding to the buffer status $S_{RN\ 2}$ allocated by the relay node RN 1 to the RN 2 in (A2) is an identifier of the RN 2; identifiers corresponding to the buffer status $S_{RN\ 2\text{-}RB\ 1}$ allocated by the relay node RN 1 to the RN 2 RB 1 between the RN 1 and the RN 2 in (A3) are an ID of the RN 2 RB 1 and the identifier of the RN 2; an identifier corresponding to the buffer status $S_{UE\ 1}$ allocated by the relay node RN 1 to the UE 1 in (A4) is the identifier of the UE 1; identifiers corresponding to the buffer status $S_{UE\ 1\text{-}A}$ allocated by the relay node RN 1 to the UE 1 PDU session A in (A5) are the identifier of the UE 1 and an ID of the UE 1 PDU session A; identifiers corresponding to the buffer status $A_{11}$ allocated by the relay node RN 1 to the UE 1 RB 1 in (A6) are the identifier of the UE 1 and an ID of the UE RB 1; and identifiers corresponding to the buffer status $Q_{11}$ allocated by the relay node RN 1 to the UE 1 QoS flow 1 in (A7) are the identifier of the UE 1 and an ID of the UE 1 QoS flow 1.

In a second implementation, the relay node receives a second packet sent by the at least one first node, to obtain a buffer status at a granularity of each first node in the at least one first node from the second packet, and a buffer status at a granularity of an RB between each first node in the at least one first node and a child node. Optionally, the relay node may further obtain a buffer status at a granularity of UE, a buffer status at a granularity of an RB of the UE, a buffer status at a granularity of a PDU session of the UE, and a buffer status at a granularity of a QoS flow of the UE. Optionally, the first information further carries an identifier specifically corresponding to each buffer status, where the identifier is used to indicate a node, a radio bearer, a PDU session, or a QoS flow corresponding to the buffer status.

Figure 3B:
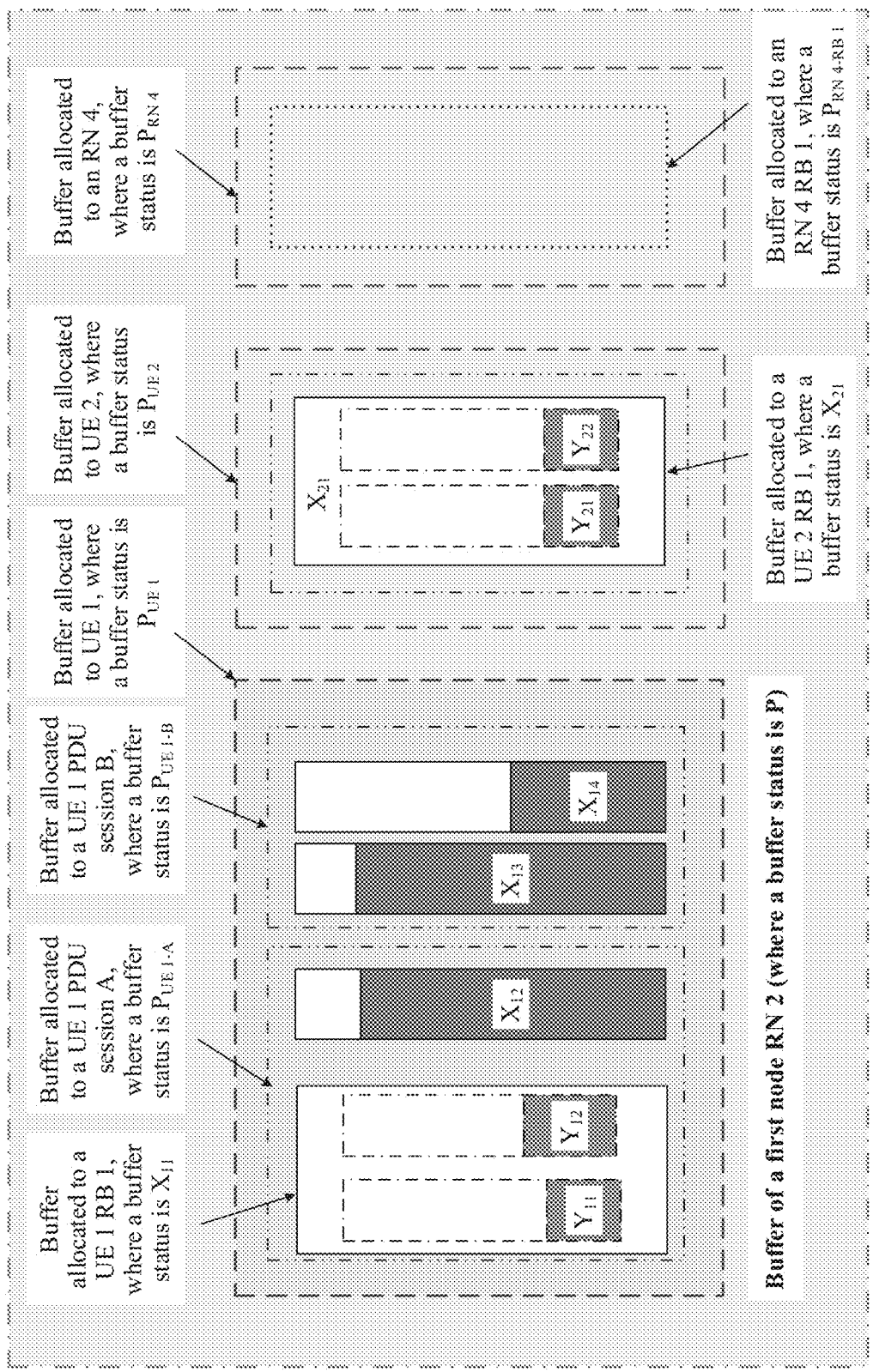

An example in which the relay node is the relay node RN 1 in FIG. 1 is used to describe in detail content included in the first information in the second implementation. As shown in FIG. 3B, the first information specifically includes:

(B1) a total buffer status P at the first node RN 2;

(B2) a buffer status at a granularity of a child node of the first node RN 2, specifically including, for example, a buffer status $P_{RN\ 4}$ allocated by the first node RN 2 to an RN 4;

(B3) a buffer status at a granularity of an RB between the first node RN 2 and the child node, specifically including, for example, a buffer status $P_{RN\ 4\text{-}RB\ 1}$ allocated by the RN 2 to a first radio bearer between the RN 4 and the RN 2 (for example, an RN 4 RB 1), and the like, where it should be noted that, if the child node of the first node RN 2 is UE, the buffer status at the granularity of the child node of the first node RN 2 in (B2) is the buffer status at the granularity of the UE, and the buffer status at the granularity of the RB between the first node RN 2 and the child node in (B3) is the buffer status at the granularity of the RB of the UE;

(B4) a buffer status at a granularity of UE, specifically including, for example, a buffer status $P_{UE\ 1}$ allocated by the first node RN 2 to UE 1, a buffer status $P_{UE\ 2}$ allocated by the first node RN 2 to UE 2, and the like;

(B5) a buffer status at a granularity of a PDU session of the UE, specifically including, for example, a buffer status $P_{UE\ 1\text{-}A}$ allocated by the first node RN 2 to a UE 1 PDU session A, a buffer status $P_{UE\ 1\text{-}B}$ allocated by the first node RN 2 to a UE 1 PDU session B, and the like;

(B6) a buffer status at a granularity of an RB of the UE, specifically including, for example, a buffer status $X_{11}$ allocated by the first node RN 2 to a UE 1 RB 1, a buffer status $X_{12}$ allocated by the first node RN 2 to a UE 1 RB 2, a buffer status $X_{21}$ allocated by the first node RN 2 to a UE 2 RB 1, and the like; and (B7) a buffer status at a granularity of a QoS flow of the UE, specifically including, for example, a buffer status $Y_{11}$ allocated by the first node RN 2 to a UE 1 QoS flow 1, a buffer status $Y_{12}$ allocated by the first node RN 2 to a UE 1 QoS flow 2, a buffer status $Y_{21}$ allocated by the first node RN 2 to a UE 2 QoS flow 1, and a buffer status $Y_{22}$ allocated by the first node RN 2 to a UE 2 QoS flow 2.

It should be noted that, optionally, the first information further carries an identifier specifically corresponding to each buffer status. For example, in (B3), identifiers corresponding to the buffer status $P_{RN\ 4\text{-}RB\ 1}$ allocated by the RN 2 to the RN 4 RB 1 are an identifier of the RN 4 and an identifier of the RN 4 RB 1. For identifiers corresponding to other buffer statuses, refer to related examples in the foregoing first implementation.

In a third implementation, the relay node monitors a buffer status of the relay node, and receives a buffer status sent by the at least one first node, to obtain a buffer status at a granularity of the relay node, a buffer status at a granularity of a radio bearer RB between the relay node and the at least one first node, a buffer status at a granularity of each first node in the at least one first node, and a buffer status at a granularity of an RB between each first node in the at least one first node and a child node. Optionally, the relay node may further obtain a buffer status at a granularity of UE, a buffer status at a granularity of an RB of the UE, a buffer status at a granularity of a PDU session of the UE, and a buffer status at a granularity of a QoS flow of the UE. Optionally, the first information further carries an identifier specifically corresponding to each buffer status, where the identifier is used to indicate a node, a radio bearer, a PDU session, or a QoS flow corresponding to the buffer status.

An example in which the relay node is the relay node RN 1 in FIG. 1 is used. In a possible design, the relay node RN 1 receives a buffer status sent by a child node of the relay node RN 1, where it is assumed that the child node is the first node RN 2. A combination operation of obtaining a union set is performed on the received buffer status and partial information in the buffer status of the RN 1 to determine the first information. In this case, the first information may include at least one of the following content:

(C1) a buffer status at a granularity of the relay node RN 1, that is, a total buffer status S of the relay node RN 1;

(C2) a buffer status at a granularity of a first node, specifically including, for example, a buffer status $S_{RN\ 2}$ allocated by the relay node RN 1 to an RN 2, a buffer status $S_{RN\ 3}$ allocated by the relay node RN 1 to an RN 3, and the like;

(C3) a buffer status at a granularity of an RB between the relay node RN 1 and the first node, specifically including, for example, a buffer status $S_{RN\ 2\text{-}RB\ 1}$ allocated by the relay node RN 1 to a first radio bearer between the relay node RN 1 and the RN 2 (for example, an RN 2 RB 1), a buffer status $S_{RN\ 3\text{-}RB\ 2}$ allocated by the relay node RN 1 to a second radio bearer RN 3 RB 2 between the relay node RN 1 and the RN 3, and the like;

(C4) a total buffer status P at the first node RN 2;

(C5) a buffer status at a granularity of a child node of the first node RN 2, specifically including, for example, a buffer status $P_{RN\ 4}$ allocated by the first node RN 2 to an RN 4;

(C6) a buffer status at a granularity of an RB between the first node RN 2 and the child node, specifically including, for example, a buffer status $P_{RN\ 4\text{-}RB\ 1}$ allocated by the RN 2 to a first radio bearer between the RN 4 and the RN 2 (for example, an RN 4 RB 1), and the like, where it should be noted that, if the child node of the first node RN 2 is UE, the buffer status at the granularity of the child node of the first node RN 2 in (C5) is the buffer status at the granularity of the UE, and the buffer status at the granularity of the RB between the first node RN 2 and the child node in (C6) is the buffer status at the granularity of the RB of the UE;

(C7) a buffer status at a granularity of UE, specifically including, for example, a buffer status $S_{UE\ 1}$ allocated by the relay node RN 1 to UE 1, a buffer status $P_{UE\ 1}$ allocated by the first node RN 2 to the UE 1, a buffer status $S_{UE\ 2}$ allocated by the relay node RN 1 to UE 2, a buffer status $P_{UE\ 2}$ allocated by the first node RN 2 to the UE 2, and the like:

(C8) a buffer status at a granularity of a PDU session of the UE, specifically including, for example, a buffer status $S_{UE\ 1\text{-}A}$ allocated by the relay node RN 1 to a UE 1 PDU session A, a buffer status $P_{UE\ 1\text{-}A}$ allocated by the first node RN 2 to the UE 1 PDU session A, a buffer status $S_{UE\ 1\text{-}B}$ allocated by the relay node RN 1 to a UE 1 PDU session B, a buffer status $P_{UE\ 1\text{-}B}$ allocated by the first node RN 2 to the UE 1 PDU session B, and the like;

(C9) a buffer status at a granularity of an RB of the UE, specifically including, for example, a buffer status $A_{11}$ allocated by the relay node RN 1 to a UE 1 RB 1, a buffer status $X_{11}$ allocated by the first node RN 2 to the UE 1 RB 1, a buffer status $A_{12}$ allocated by the relay node RN 1 to a UE 1 RB 2, a buffer status $A_{21}$ allocated by the relay node RN 1 to a UE 2 RB 1, a buffer status $X_{21}$ allocated by the first node RN 2 to the UE 2 RB 1, a buffer status $A_{31}$ allocated by the relay node RN 1 to a UE 3 RB 1, and the like;

(C10) a buffer status at a granularity of a QoS flow of UE, specifically including, for example, a buffer status $Q_{11}$ allocated by the relay node RN 1 to a UE 1 QoS flow 1, a buffer status $Y_{11}$ allocated by the first node RN 2 to the UE 1 QoS flow 1, a buffer status $Q_{12}$ allocated by the relay node RN 1 to a UE 1 QoS flow 2, a buffer status $Y_{12}$ allocated by the first node RN 2 to the UE 1 QoS flow 2, a buffer status $Q_{21}$ allocated by the relay node RN 1 to a UE 2 QoS flow 1, a buffer status $Y_{21}$ allocated by the first node RN 2 to the UE 2 QoS flow 1, a buffer status $Y_{22}$ allocated by the first node RN 2 to a UE 2 QoS flow 2, and the like.

It should be noted that, optionally, the first information further carries an identifier specifically corresponding to each buffer status. For an identifier corresponding to a specific buffer status, refer to related examples in the foregoing first and second implementations.

It should be noted that, in the foregoing example of the third implementation, when the first information is determined, a combination operation of obtaining a union set needs to be performed on some content (for example, content in (C7) to (C10)). It should be noted that, the operation, of obtaining the union set, used in this example is merely an implementation form of a combination operation, or may be another combination operation form, for example, an operation such as obtaining a maximum value, obtaining a minimum value, or performing summation. This is not specifically limited in this application.

It should be noted that the buffer status at the granularity of the relay node is a local buffer status of the relay node, that is, summary information of buffer statuses at the relay node, for example, summary information of buffer statuses at granularities of all UEs served by the relay node (including UE directly connected to the relay node, and UE indirectly served by the relay node, namely, UE connected to another relay node that needs to establish a backhaul link to a base station through the relay node) or buffer statuses at granularities of radio bearers of the UEs, or summary information of buffer statuses that are at granularities of all first nodes and that are at the relay node, where the first node is a child node of the relay node, for example, a secondary relay node connected to the relay node, or UE connected to a serving cell of the relay node. For example, in FIG. 1, all first nodes of the relay node RN 1 include the first node RN 2, the first node RN 3, and the UE 3.

The buffer status at the granularity of the RB between the relay node and the first node is a buffer status that is between the relay node and the first node and that is specific to each RB in the buffer statuses of the relay node. For example, if the relay node performs buffer management and allocation at a granularity of an RB between each child node and the relay node, the buffer status at the granularity of an RB between the relay node and the first node is a buffer status that is of a specific RB between the first node and the relay node and that is at the relay node. Alternatively, if the relay node performs buffer management and allocation at the granularity of a radio bearer of UE, a buffer status corresponding to a specific RB (denoted as a target RB) between the relay node and the first node is summary information of buffer statuses, of radio bearers that are of all UEs and on which a data packet needs to be transmitted through the first node and that are to be mapped to the target RB, at the relay node.

The buffer status at the granularity of the first node refers to summary information of buffer statuses related to the first node in the buffer statuses of the relay node. For example, if the relay node performs buffer allocation and management based on each child node, the buffer status at the granularity of the first node is a buffer status allocated by the relay node to the first node. Alternatively, if the relay node performs buffer management and allocation at a granularity of an RB between each child node and the relay node, the buffer status at the granularity of the first node is summary information of buffer statuses that are of all RBs between the first node and the relay node and that are at the relay node. Alternatively, if the relay node performs buffer management and allocation at a granularity of UE, the buffer status at the granularity of the first node is summary information of buffer statuses, of all UEs that need to transmit a data packet through the first node, at the relay node. Alternatively, if the relay node performs buffer management and allocation at a granularity of a radio bearer of UE, the buffer status at the granularity of the first node is summary information of buffer statuses, of radio bearers that are of all UEs and on which a data packet needs to be transmitted through the first node, at the relay node.

In a possible manner, the buffer status at the granularity of UE may be a buffer status corresponding to specific UE in the buffer statuses of the relay node. For example, if the relay node performs buffer management and allocation at a granularity of UE, the buffer status at the granularity of UE is a buffer status that corresponds to specific UE and that is at the relay node. Alternatively, if the relay node performs buffer management and allocation at a granularity of a radio bearer of UE, the buffer status at the granularity of UE is summary information of buffer statuses, of all radio bearers that are of specific UE and on which a data packet needs to be transmitted through the relay node, at the relay node. In another possible manner, the buffer status at the granularity of UE is summary information obtained by summarizing a buffer status that corresponds to specific UE and that is at the relay node and in the buffer statuses of the relay node, and a buffer status that corresponds to the UE and that is included in a second packet, where the buffer status is a buffer status of a child node that is received by the relay node.

In a possible manner, the buffer status at the granularity of an RB of UE may be a buffer status corresponding to a specific radio bearer of specific UE in the buffer statuses of the relay node. For example, if the relay node performs buffer management and allocation at a granularity of an RB of UE, the buffer status at the granularity of an RB of UE is a buffer status that corresponds to a specific radio bearer of specific UE and that is at the relay node. In another possible manner, the buffer status at the granularity of an RB of UE is summary information obtained by summarizing a buffer status that corresponds to a specific radio bearer of specific UE and that is at the relay node and in the buffer statuses of the relay node, and a buffer status that corresponds to the specific radio bearer of the UE and that is included in a second packet, where the buffer status is a buffer status of a child node that is received by the relay node.

In a possible manner, the buffer status at the granularity of a PDU session of UE may be a buffer status that corresponds to a specific PDU session of specific UE in the buffer statuses of the relay node. For example, if the relay node can identify a PDU session of UE corresponding to a data packet (where for example, in a multi-hop IAB network including layer 3 relays, the relay node may maintain a general packet radio service tunneling protocol (GTP) tunnel corresponding to the PDU session of the UE, and therefore can identify the PDU session of the UE), the relay node may perform buffer management and allocation at a granularity of the PDU session of the UE. A buffer status at the granularity of a PDU session of UE is a buffer status that is of a specific PDU session corresponding to specific UE and that is at the relay node. In another possible manner, the buffer status at the granularity of a PDU session of UE is summary information obtained by summarizing a buffer status that corresponds to a specific PDU session of specific UE and that is at the relay node and in the buffer statuses of the relay node, and a buffer status that corresponds to the specific PDU session of the UE and that is included in a second packet, where the buffer status is a buffer status of a child node that is received by the relay node.

In a possible manner, the buffer status at the granularity of a QoS flow of UE may be a buffer status that corresponds to a specific QoS flow of specific UE in the buffer statuses of the relay node. For example, if the relay node can identify a QoS flow of UE corresponding to a data packet (where for example, in a multi-hop IAB network including layer 3 relays, the relay node may maintain a GTP tunnel corresponding to a UE PDU session, and a data packet of UE may carry a QoS flow identifier QFI in a GTP header; therefore, the relay node can identify a QoS flow of the UE), the relay node may perform buffer management and allocation at a granularity of the QoS flow of the UE. A buffer status at the granularity of a QoS flow of UE is a buffer status that is of a specific QoS flow corresponding to specific UE and that is at the relay node. In another possible manner, the buffer status at the granularity of a QoS flow of UE is summary information obtained by summarizing a buffer status that corresponds to a specific QoS flow of specific UE and that is at the relay node and in the buffer statuses of the relay node, and a buffer status that corresponds to the specific QoS flow of the UE and that is included in a second packet, where the buffer status is a buffer status of a child node that is received by the relay node.

The radio bearer in this application may be a data radio bearer (DRB), a signaling radio bearer (SRB), or an RLC bearer.

In this application, a buffer status at a granularity B of a node A may be a physical buffer allocated to the node A based on the granularity B, or may be a physical buffer allocated to the node A based on a receiving/sending window of the granularity B (in this case, it may be understood that a buffer status at the granularity B is determined by a total quantity of data packets that can be accommodated or a quantity of data packets within the receiving/sending window corresponding to the granularity B, where the receiving/sending window is configured to limit an effective receiving/sending range of data corresponding to the granularity B). Specifically, in this application, the buffer status includes at least one of the following content: (1) a total amount of existing data in a buffer, for example, a total amount of data in a buffer at a given granularity, where the total amount of data may be described by using an accurate value (for example, a value described by using a byte or a bit as a unit, which is accurate to the ones digit of place values of a natural number) or by using a range (for example, a range in limited ranges obtained through dividing the total data amount, where each range corresponds to one value, so that feedback overheads can be reduced); (2) a sequence number of a data packet in a buffer, including, for example, a minimum value of a sequence number of a data packet in a buffer at a given granularity, a maximum value of a sequence number of the data packet in the buffer at the given granularity, an enumeration of sequence numbers of all data packets in the buffer at the given granularity, and the like; (3) a quantity of data packets in a buffer; (4) a total buffer space size, for example, a total amount of data that can be accommodated in a buffer, or a quantity of data packets that can be accommodated in the buffer; and (5) a size of a remaining space of a buffer, for example, a total amount of data that may be further added to the buffer, or a quantity of data packets that may be further added to the buffer.

The summary information of buffer statuses in this application is a summary buffer status obtained after a combination operation is performed on a plurality of buffer statuses that need to be summarized. The combination operation may be summation. For example, summation may be separately performed on items, such as total amounts of existing data in buffers, quantities of data packets in the buffers, total sizes of the buffers, and remaining spaces of the buffers, that are included in the plurality of buffer statuses that need to be summarized, and summation results are used as content in the summary information. Alternatively, a maximum value is obtained, for example, a maximum value is obtained from "maximum values of sequence numbers of data packets in the buffers" that are included in the plurality of buffer statuses that need to be summarized, and is used as "a maximum value of sequence numbers of data packets in the buffers" in the summary information. Alternatively, a minimum value is obtained, for example, a minimum value is obtained from "minimum values of sequence numbers of data packets in the buffers" that are included in the plurality of buffer statuses that need to be summarized, and is used as "a minimum value of sequence numbers of data packets in the buffers" in the summary information. Alternatively, a union set of a plurality of sets is obtained. For example, if a buffer status includes an "enumeration of sequence numbers of all data packets in a buffer", the "enumeration of sequence numbers of all data packets in a buffer" are considered as a set 1, a union set of sets 1 in the plurality of buffer statuses that need to be summarized is obtained to obtain a set 2, and the set 2 is used as an "enumeration of sequence numbers of all data packets in the buffers" in the summary information. Alternatively, any of a plurality of combinations of the foregoing several operation forms may be used. A specific form and a sequence of combination operations related to a summary are not limited in this application.

In a possible design, the first information further includes at least one of a link status indication (for example, the link status is link blockage (outage) or link resume) between the relay node and the at least one first node, and a sequence number of a data packet that is already successfully sent by the relay node to the first node or the UE (which may be a maximum value of sequence numbers of data packets already successfully sent to the first node or the UE currently, or an enumeration of sequence numbers of all data packets already successfully sent to the first node or the UE but that are not fed back), a sequence number of a data packet that the relay node determines to be lost or that is not fed back to the second node, signal quality of a link between the relay node and the at least one first node, a bandwidth or a transmission rate at a granularity of the relay node, a bandwidth or a transmission rate at a granularity of the UE, a bandwidth or a transmission rate at a granularity of a radio bearer of the UE, an average or minimum transmission delay of the link between the relay node and the at least one first node (which is an average/minimum unidirectional transmission delay (uplink and/or downlink) of the link between the relay node and the at least one first node, or an average/minimum round-trip delay of the link between the relay node and the at least one first node), an average wait time or a minimum wait time of data packets at the relay node, and a load degree indication of the relay node, where the second node is a parent node or a destination node of the relay node.

A round-trip delay (RTT) of the link between the relay node and the at least one first node is a total time from a moment at which the relay node sends data to a moment at which the relay node receives an acknowledgment (for example, an acknowledgment (ACK) or a negative acknowledgment (NACK)) for the data from the first node.

It should be noted that, the first information in this embodiment of this application may further include information about a link between a level n child node of the relay node and a level n+1 child node of the relay node (where n is a positive integer greater than or equal to 1), and a summary of information about each segment of link between the relay node and level n child nodes of the relay node, where the information about the link herein may be, for example, a link status indication, signal quality of the link, an average or minimum transmission delay of the link, a link bandwidth or transmission rate, or the like. The level n child node of the relay node is a child node connected to the relay node through n-hop links. For example, the first node is directly connected to the relay node through a one-hop link. Therefore, the first node is a level 1 child node of the relay node, a child node of the first node is a level 2 child node of the relay node, and so on.

A type of the first node may be a relay node, or may be a terminal.

Optionally, the first packet further includes first indication information, used to indicate that the first packet is a packet including flow control feedback information.

Specifically, when the relay node sends the first packet to the second node in step 210, a specific implementation process is as follows: The relay node determines that the second node is a destination node that receives the first packet, and the relay node sends the first packet that carries the first information to the second node.

There are at least the following two manners for the relay node to determine that the second node is the destination node that receives the first packet.

In a manner 1, the relay node determines, based on the first indication information, that the second node is the destination node that receives the first packet. For example, if the first packet includes a service type indication, it indicates that a service type of the first information is feedback information related to flow control, and the relay node may determine that the second node is the destination node that receives the first packet.

In a manner 2, the relay node determines, based on the destination address carried in the second packet received from the first node, that the second node is the destination node that receives the first packet. For example, the destination address carried in the second packet is an identifier of the second node, or the destination address carried in the second packet is an identifier of a multicast/broadcast address, and nodes corresponding to the identifier of the multicast/broadcast address includes the second node.

In this application, the identifier of the second node may be, for example, an IP address, a MAC address, a relay node identifier (RN ID) of the second node, an identifier of a cell served by the second node, a base station identifier (for example, a next generation NodeB identifier gNB ID), a local unique identifier allocated by a donor base station to the second node, a UE ID when the second node includes a UE part, or the like, and a specific node identifier type is not limited.

Further, after the relay node determines that the second node is the destination node that receives the first packet, the relay node may send, in the following two manners, the first packet that carries the first information to the second node.

In a manner 1, the relay node determines that the second node is the destination node that receives the first packet, and directly sends the first packet that carries the first information to the second node. In this implementation, the relay node that serves as an aggregation node does not perform any processing on the received first information, but directly sends the first packet that carries the first information and that is generated by the relay node to the second node. Certainly, the relay node may alternatively directly send the first information to the second node.

In a manner 2, the relay node determines that the second node is the destination node that receives the first packet, summarizes the first information, and sends the first packet that carries the first information to the second node. In this implementation, the relay node summarizes some or all content of the received second packet, and sends the first packet that carries the summarized content and that is generated by the relay node to the second node. For example, the relay node may summarize buffer statuses at granularities of UEs, at granularities of radio bearers of UEs, at granularities of PDU sessions of UEs, or at granularities of QoS flows of UEs, or may summarize bandwidths/transmission rates at granularities of relay nodes, at granularities of UEs, or at granularities of radio bearers of UEs, or may summarize average transmission delays or minimum transmission delays of links. The operation of summarizing the bandwidth/transmission rates and the average/minimum transmission delays also involves combination of content of a plurality of items. The combination operation may be an operation such as summation, maximum value obtaining, minimum value obtaining, or union set obtaining. For understanding, refer to the foregoing combination operations related to the buffer status summary.

When sending the first packet to the second node, the relay node may periodically send the first packet to the second node. Alternatively, the relay node sends the first packet to the second node when a preset event is triggered.

According to a protocol function supported by the relay node most, the relay node in this embodiment of this application may be applied to a layer 3 relay (where a data packet forwarded by the relay node is, for example, an internet protocol IP (IP) data packet or a PDU carried in a PDU session of UE of another type of network such as an Ethernet Ethernet) scenario, a layer 2 relay (where a data packet forwarded by the relay node is, for example, a PDCP protocol data unit (PDU), a service data adaptation protocol (SDAP) PDU, a radio link control (RLC) PDU, a medium access control (MAC) PDU, or the like) scenario, and may be applied to a layer 3+ layer 2 relay hybrid networking scenario. In the hybrid networking scenario, in an optional manner, when there are a plurality of backhaul links, the relay node used as a traffic distribution anchor is a layer 3 relay, and a relay node at another location is a layer 2 relay.

In these different protocol architectures, feedback granularities of relay nodes are different. For example, for the layer 2 relay, when a buffer status and a data packet receiving (packet loss feedback)/sending status are fed back, a specific feedback granularity may be a granularity of a radio bearer of UE, a granularity of UE, a granularity of a radio bearer of an RN, a granularity of an RN, or the like. For another example, for the layer 3 relay, in addition to the foregoing granularities, a feedback granularity may be a granularity of a PDU session of UE, a granularity of a QoS flow of UE, or the like.

It should be noted that, according to a difference between protocol functions supported by the relay node, the first packet may possibly be sent in a plurality of manners. For example, the first packet sent by the relay node may be sent on a peer GTP layer between the relay node and the second node, or sent on a peer adaptation layer between the relay node and the second node, or sent on a peer control layer between the relay node and the second node. The following provides an example for description.

For example, FIG. 4A to FIG. 4E are schematic diagrams of a user plane protocol stack architecture in a two-hop relay networking scenario. Certainly, during actual application, there may be any quantity of relay nodes, and a user may be extended to a single-hop or any multi-hop relay networking scenario. For example, an RN 1 in FIG. 4A to FIG. 4E is removed, so that the scenario is evolved to a single-hop relay networking scenario. Alternatively, during actual application, any more other relay nodes may be added between an RN 2 and the RN 1, so that the scenario is extended to a multi-hop relay networking scenario with more than two hops. For understanding of a protocol stack on an interface between the newly added relay nodes and the RN 1/RN 2, refer to a protocol stack between the RN 1 and the RN 2.

Figure 4A:
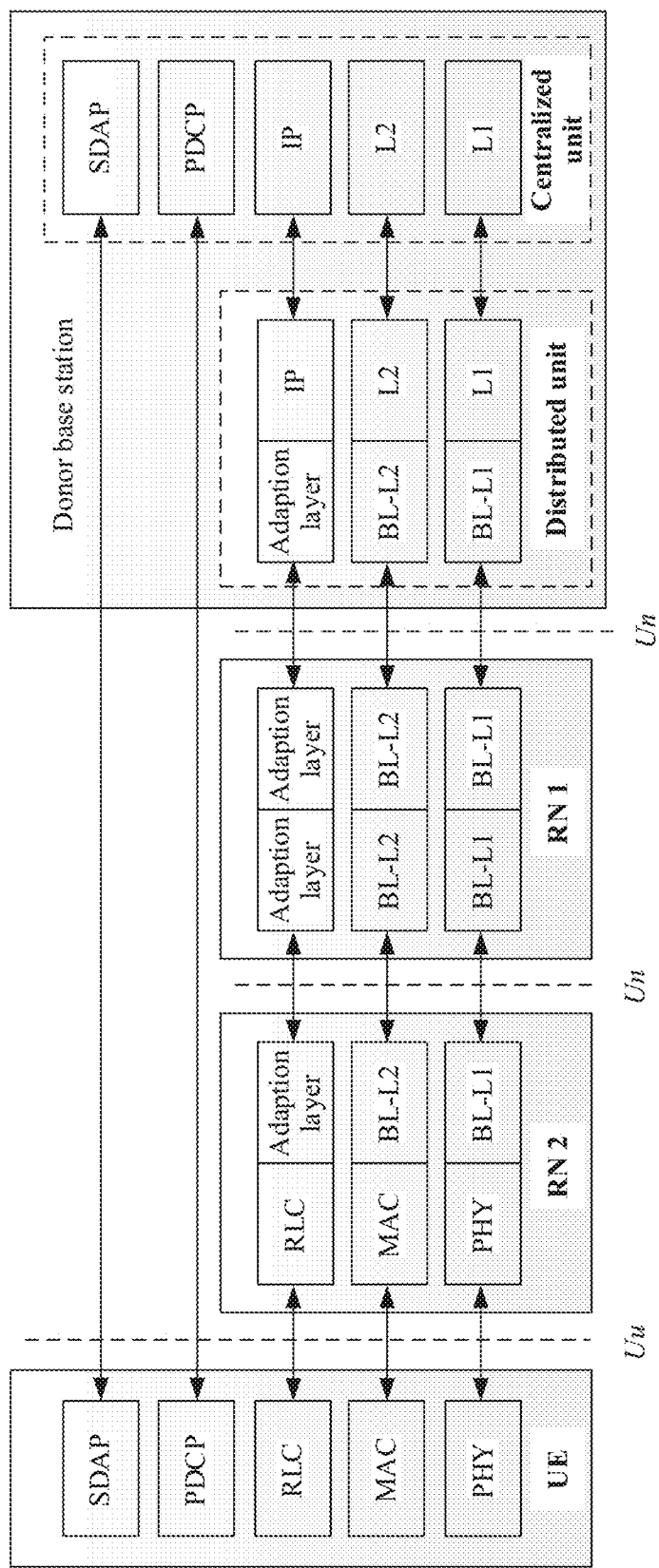
FIG. 4A to FIG. 4E are schematic diagrams of a two-hop user plane protocol architecture according to an embodiment of this application.

For the schematic diagram of the user plane protocol stack architecture shown in FIG. 4A, the first packet fed back by the relay node may be carried in an adaptation (Adapt) layer PDU and sent to the second node. In this case, the second node may be another relay node or a donor base station (e.g. DgNB) that serves as a parent node of the relay node. Optionally, if the donor base station is in a form in which a centralized unit and a distributed unit are separated, the second node may alternatively be a distributed unit of the donor base station (Donor-DU) or a centralized unit of the donor base station (Donor-CU).

Figure 4B:
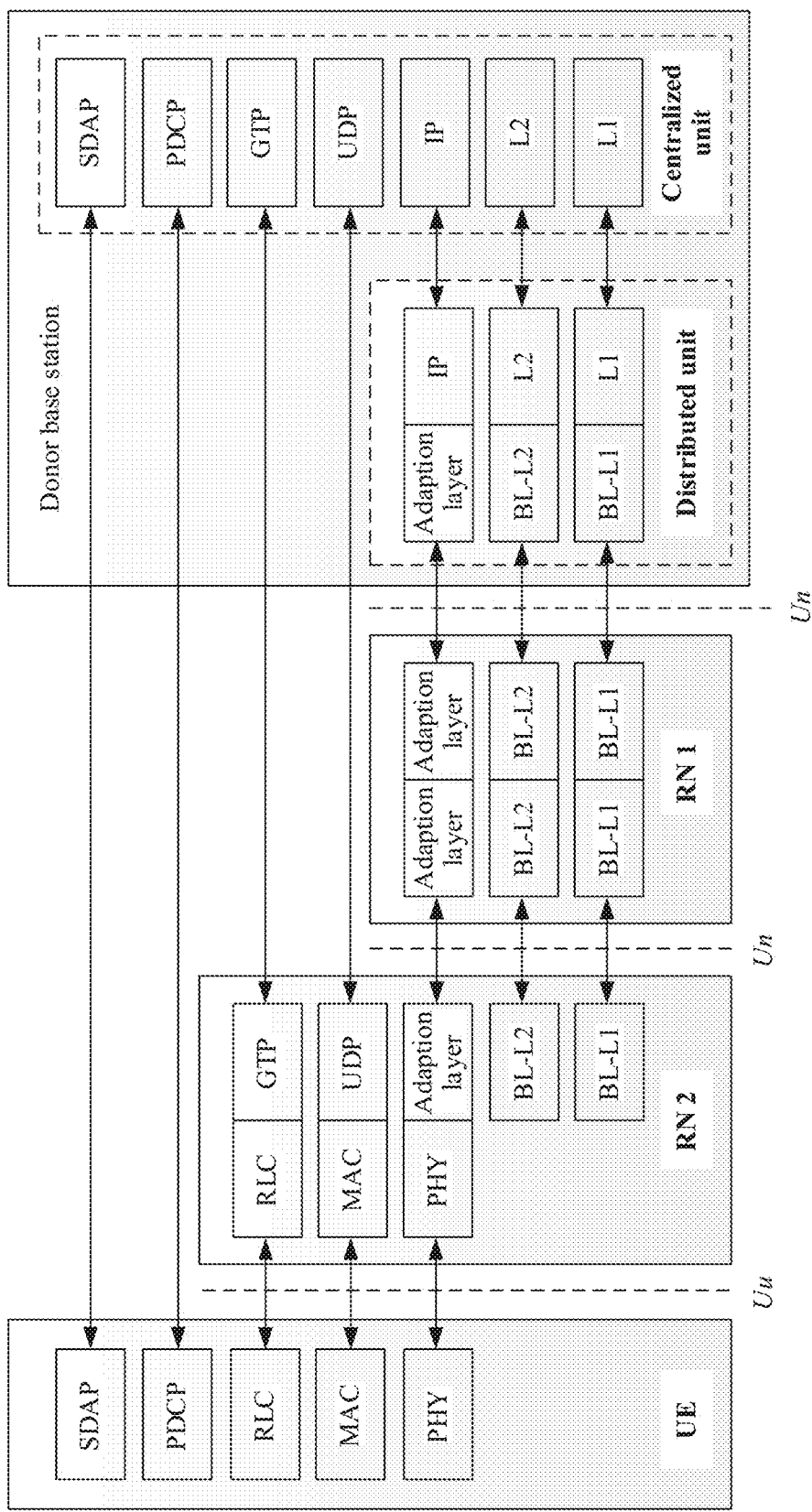

For the schematic diagram of the user plane protocol stack architecture shown in FIG. 4B, the first packet fed back by the relay node may be carried in an Adapt PDU and sent to the second node. The second node may be another relay node or a donor base station that serves as a parent node of the relay node. Optionally, if the donor base station is in a form in which a centralized unit and a distributed unit are separated, the second node may alternatively be a distributed unit of the donor base station or a centralized unit of the donor base station. Alternatively, the first packet fed back by the relay node may be carried in a GTP PDU and sent to the second node. In this case, the second node may be a donor base station. Optionally, if the donor base station is in a form in which a centralized unit and a distributed unit are separated, the second node may alternatively be a centralized unit of the donor base station.

Figure 4C:
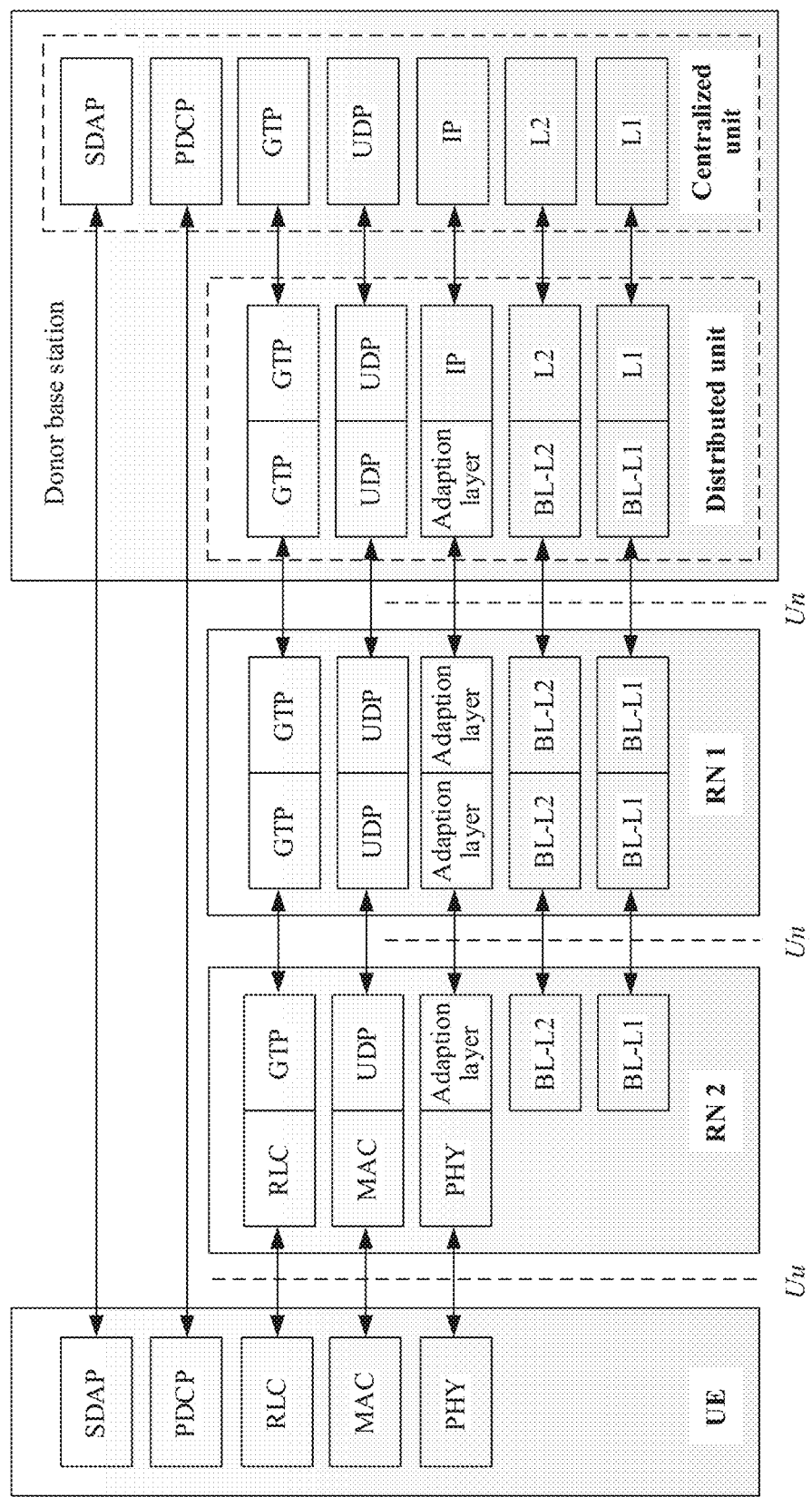

For the schematic diagram of the user plane protocol stack architecture shown in FIG. 4C, the first packet fed back by the relay node may be carried in an Adapt PDU and sent to the second node. The second node may be another relay node or a donor base station that serves as a parent node of the relay node. Optionally, if the donor base station is in a form in which a centralized unit and a distributed unit are separated, the second node may alternatively be a distributed unit of the donor base station or a centralized unit of the donor base station. Alternatively, the first packet fed back by the relay node may be carried in a GTP PDU and sent to the second node. In this case, the second node may be another relay node or a donor base station that serves as a parent node of the relay node. Optionally, if the donor base station is in a form in which a centralized unit and a distributed unit are separated, the second node may alternatively be a distributed unit of the donor base station or a centralized unit of the donor base station.

Figure 4D:
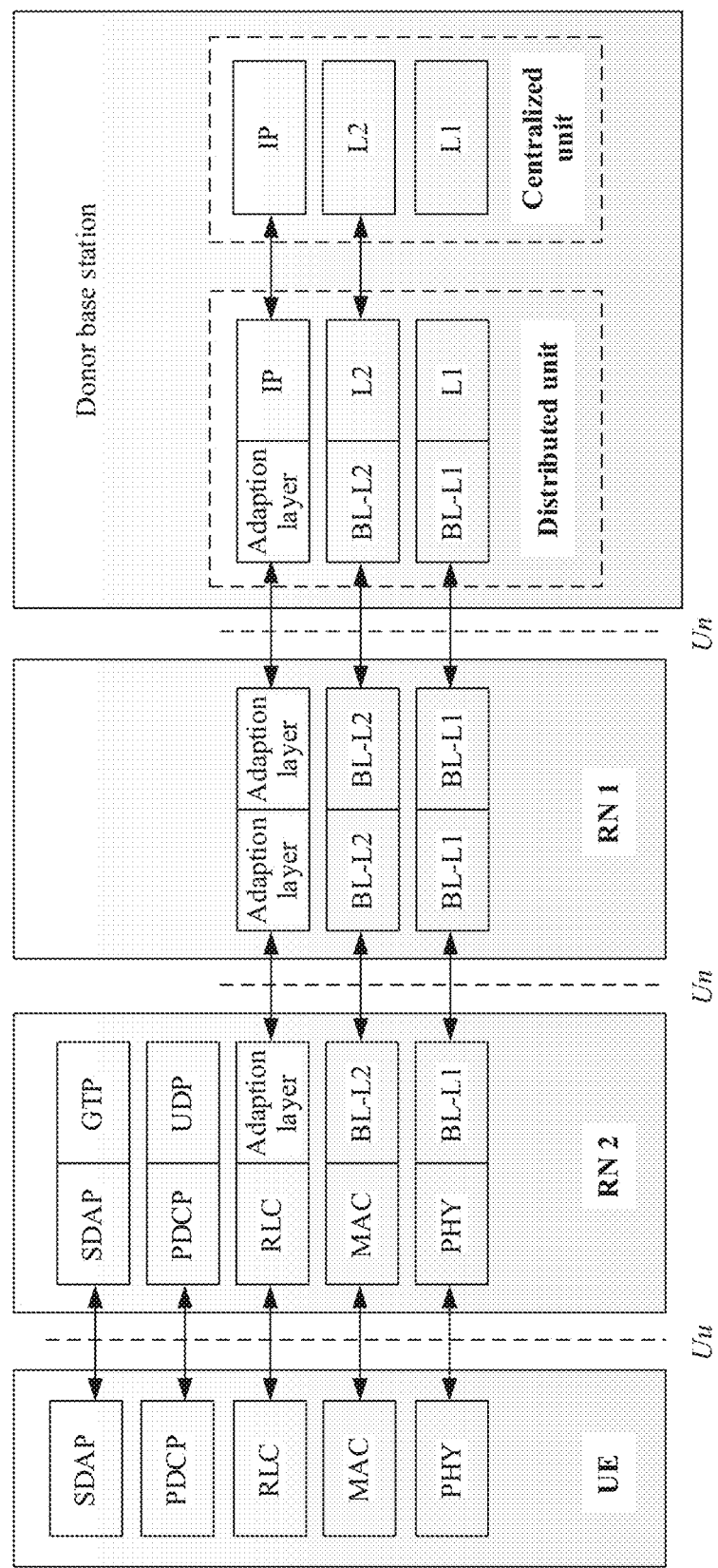

For the schematic diagram of the user plane protocol stack architecture shown in FIG. 4D, the first packet fed back by the relay node may be carried in an Adapt PDU and sent to the second node. In this case, the second node may be another relay node or a donor base station that serves as a parent node of the relay node. Optionally, if the donor base station is in a form in which a centralized unit and a distributed unit are separated, the second node may alternatively be a distributed unit of the donor base station or a centralized unit of the donor base station.

Figure 4E:
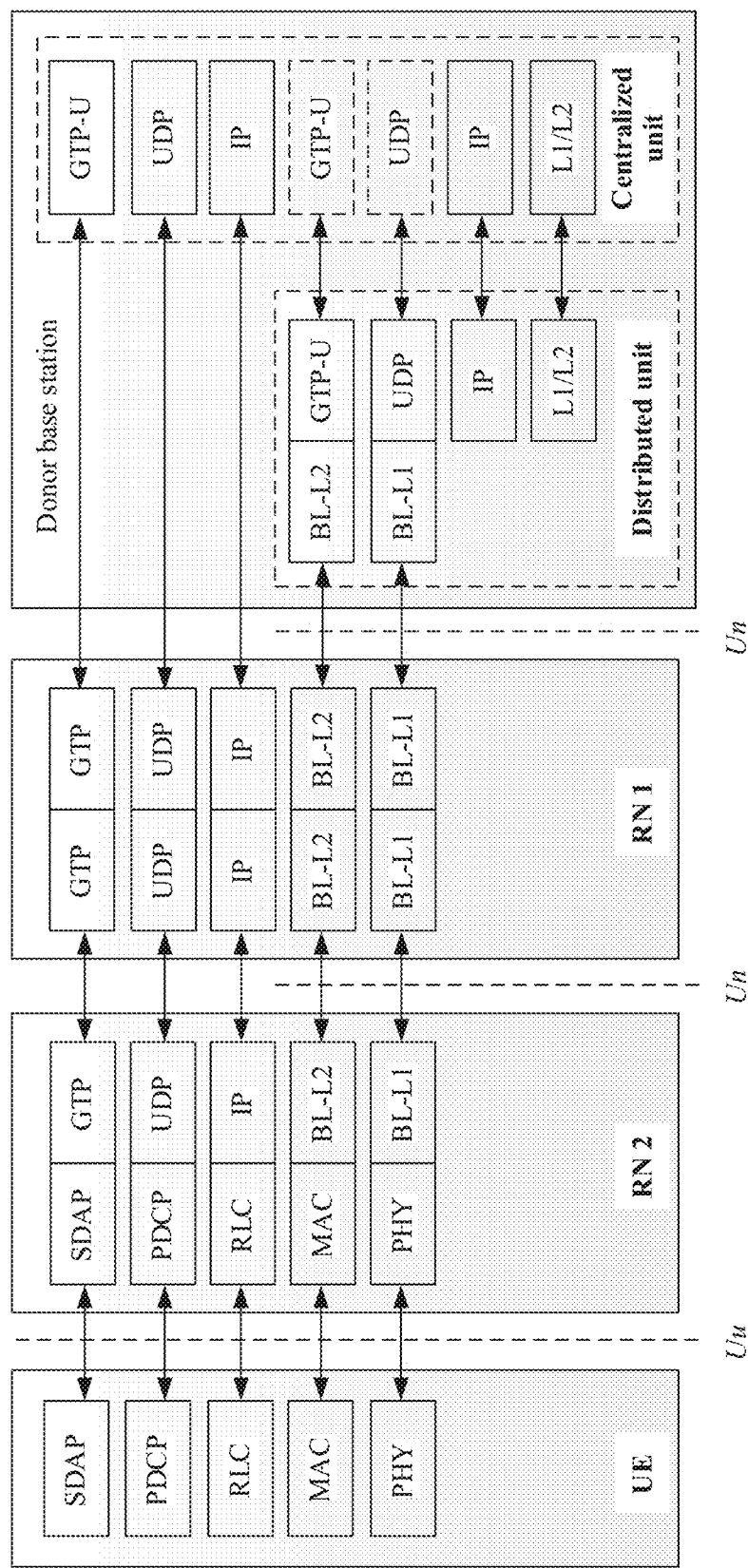

For the schematic diagram of the user plane protocol stack architecture shown in FIG. 4E, the first packet fed back by the relay node may be carried in a GTP PDU and sent to the second node. In this case, the second node may be another relay node or a donor base station that serves as a parent node of the relay node. Optionally, if the donor base station is in a form in which a centralized unit and a distributed unit are separated, the second node may alternatively be a centralized unit of the donor base station.

It should be noted that, if the donor base station (e.g. DgNB) in this embodiment of this application is a complete function entity, and a form in which a centralized unit (CU) and a distributed unit (DU) are separated is not considered, a protocol stack on an interface between the CU and the DU in the schematic diagram does not need to be used, and the DgNB only needs to reserve, on an access network side, peer protocol stacks that are between the DgNB and the relay node and between the DgNB and the UE.

Further, for a solution in which UE feeds back the first packet, in the user plane protocol stack architectures shown in FIG. 4A, FIG. 4B, and FIG. 4C, a peer layer of a PDCP protocol layer of the UE is located at the donor base station or the centralized unit of the donor base station. If the UE feeds back the first packet in a PDCP PDU, the UE sends the first packet to the donor base station or the centralized unit of the donor base station through at least one relay node. Alternatively, in the user plane protocol stack architectures shown in FIG. 4D and FIG. 4E, a peer layer of a PDCP protocol layer of the UE is located at a relay node (for example, the RN 2 in FIG. 4). In this case, the UE sends the first packet to the relay node (for example, the RN 2 in FIG. 4A to FIG. 4E).

In addition, the protocol stacks shown in FIG. 4A to FIG. 4E may be flexibly changed based on different actual applications. For example, in FIG. 4B, in a possible design, there may be no peer UDP layer between the RN 2 and the DgNB/donor-CU. In FIG. 4C, in a possible design, there may be no peer UDP layer between the RN 2 and the RN 1 and between the RN 1 and the donor-DU. In FIG. 4E, there may be no peer UDP layer between the RN 2 and the RN 1 and between the RN 1 and the donor-CU. In FIG. 4C and FIG. 4D, in a possible design, the peer Adapt layer between the RN 1 and the RN 2 may alternatively be replaced with an IP layer, and similarly, the peer Adapt layer between the RN 1 and the DgNB/donor-DU may alternatively be replaced with an IP layer. In FIG. 4E, in a possible design, a peer IP layer between the RN 2 and the RN 1 or a peer IP layer between the RN 1 and the DgNB/donor-CU may be replaced with an Adapt layer. Optionally, there may be no peer GTP layer and/or UDP layer between the donor-CU and the donor-DU. Optionally, there may be a peer Adapt layer or IP layer between the RN 1 and the donor-DU above BL-L2.

It may be understood that a PDU of each protocol layer (for example, a GTP PDU or an Adapt PDU) refers to a data packet that is processed on the protocol layer and then delivered to a next protocol layer.

Further, FIG. 4A to FIG. 5E are schematic diagrams of a control plane protocol stack architecture in a two-hop relay networking scenario. Certainly, during actual application, there may be any quantity of relay nodes, and a user may be extended to a single-hop or any multi-hop relay networking scenario. For example, an RN 1 in FIG. 5A to FIG. 5E is removed, so that the scenario is evolved to a single-hop relay networking scenario. Alternatively, during actual application, any more other relay nodes may be added between an RN 2 and the RN 1, so that the scenario is extended to a multi-hop relay networking scenario with more than two hops. For understanding of a protocol stack on an interface between the newly added relay nodes and the RN 1/RN 2, refer to a protocol stack between the RN 1 and the RN 2.

Further, manners of sending the first packet are different if protocol functions supported by the relay node are different. The following provides an example for description.

Figure 5A:
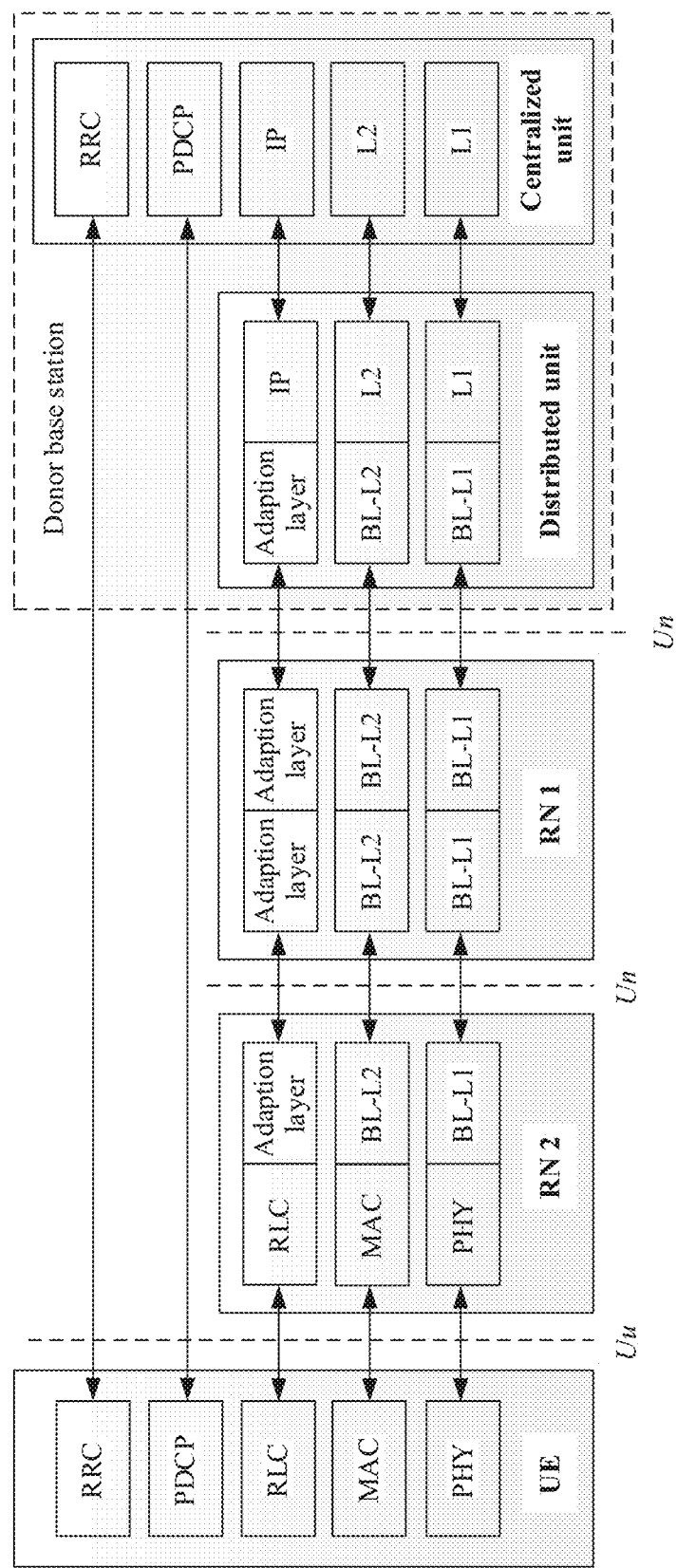
FIG. 5A to FIG. 5E are schematic diagrams of a two-hop control plane protocol architecture according to an embodiment of this application.
Figure 5B:
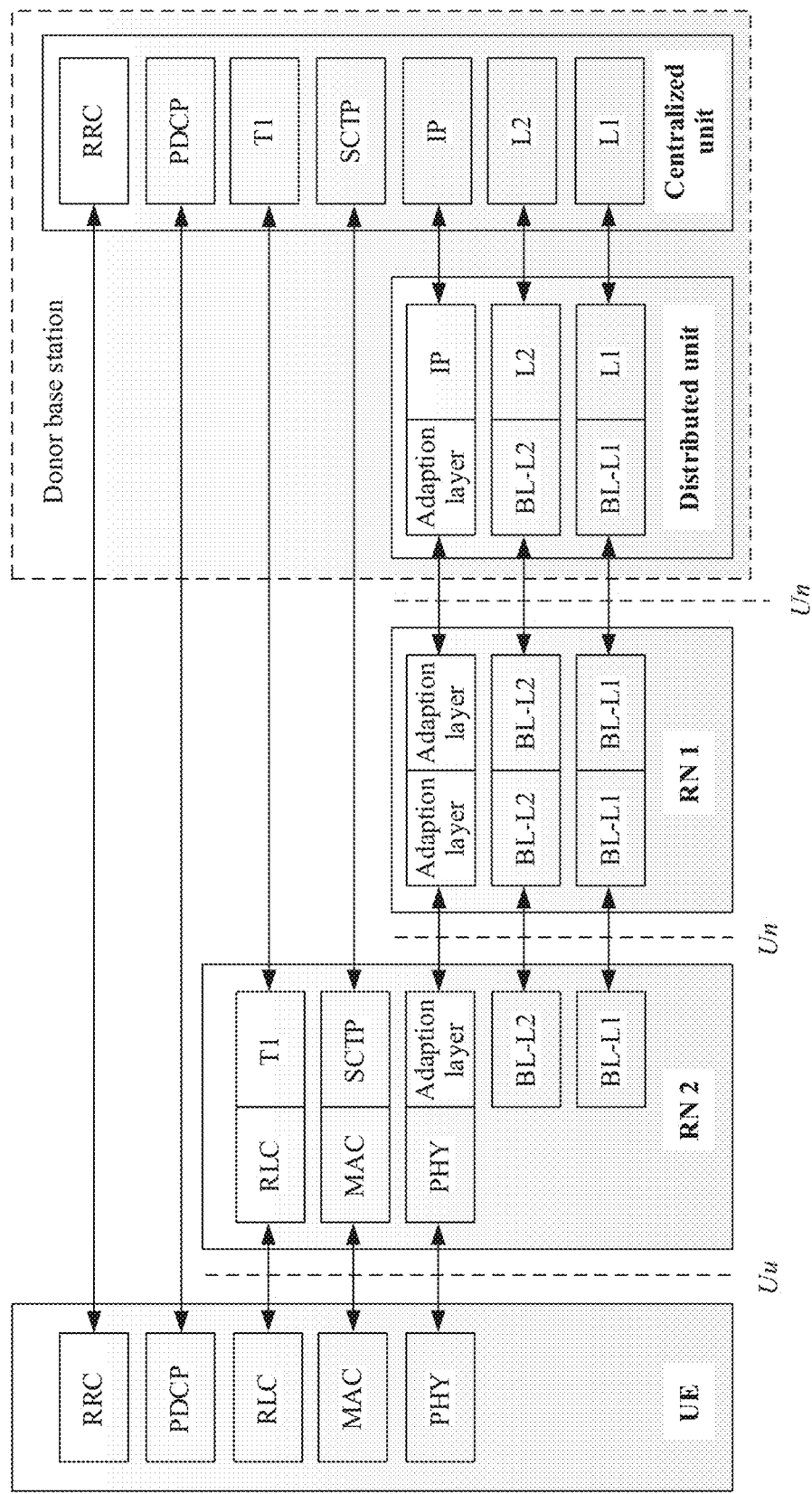

For the schematic diagram of the control plane protocol stack architecture shown in FIG. 5B, the first packet fed back by the relay node may be carried in a T1 layer message (or a T1 layer PDU) and sent to the second node. In this case, the second node may be a donor base station. Optionally, if the donor base station is in a form in which a centralized unit and a distributed unit are separated, the second node may alternatively be a centralized unit of the donor base station. Optionally, the T1 protocol layer may be, for example, an F1-AP layer, and may be configured to send information between the relay node and the second node, where the information includes control messages, for example, content such as a connection management related message between the relay node and the second node, UE-related context configuration information, and an RRC message of UE, and a name of the T1 protocol layer is not limited.

Figure 5C:
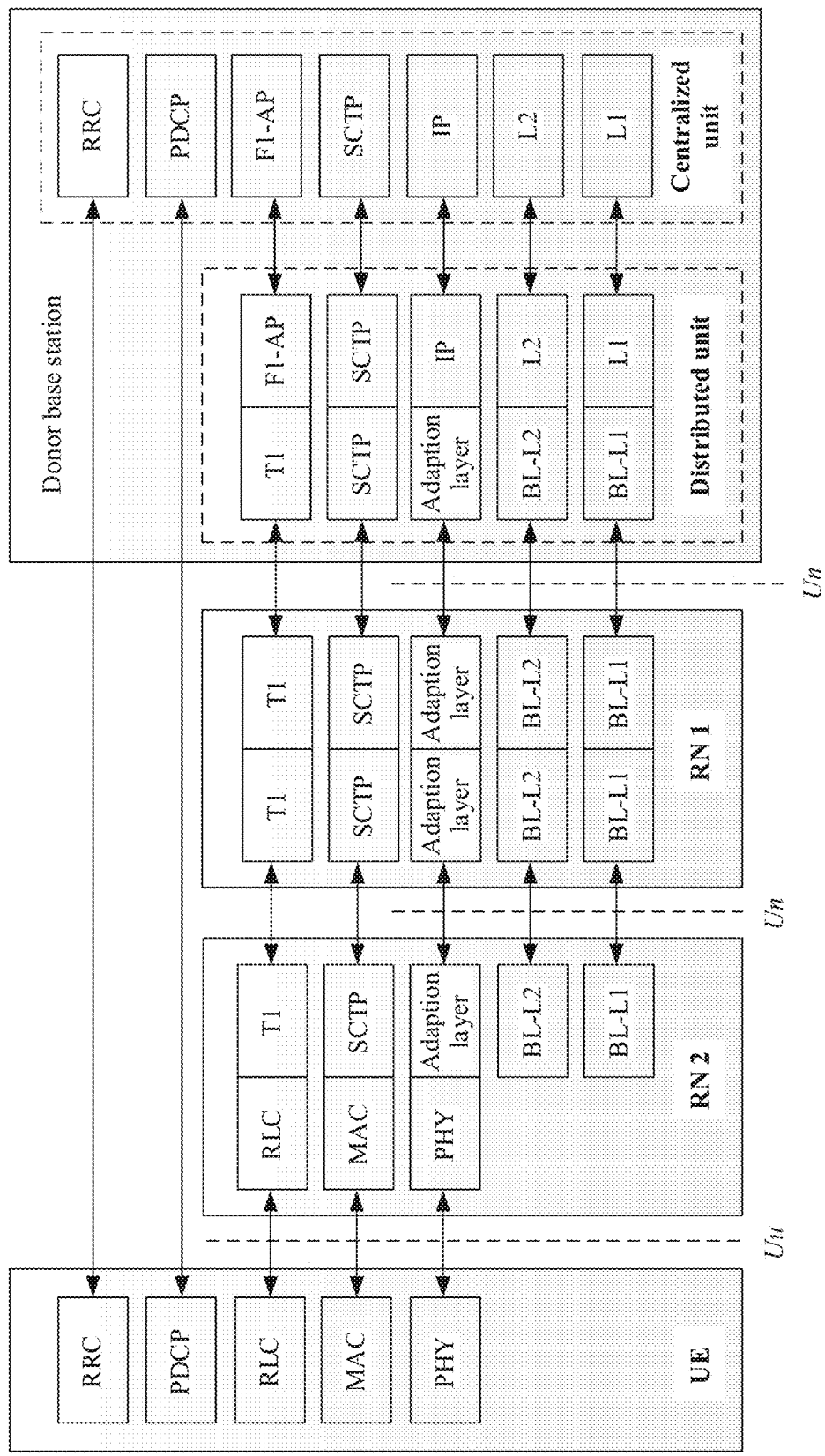

For the schematic diagram of the control plane protocol stack architecture shown in FIG. 5C, the first packet fed back by the relay node may be carried in a T1 layer message (or a PDU on a T1 layer) and sent to the second node. In this case, the second node may be another relay node or a donor base station that serves as a parent node of the relay node. Optionally, if the donor base station is in a form in which a centralized unit and a distributed unit are separated, the second node may alternatively be a distributed unit of the donor base station or a centralized unit of the donor base station. Optionally, the T1 protocol layer may be, for example, an F1-AP layer, and may be configured to send information between the relay node and the second node, where the information includes control messages, for example, content such as a connection management related message between the relay node and the second node, UE-related context configuration information, and an RRC message of UE, and a name of the T1 protocol layer is not limited.

Figure 5D:
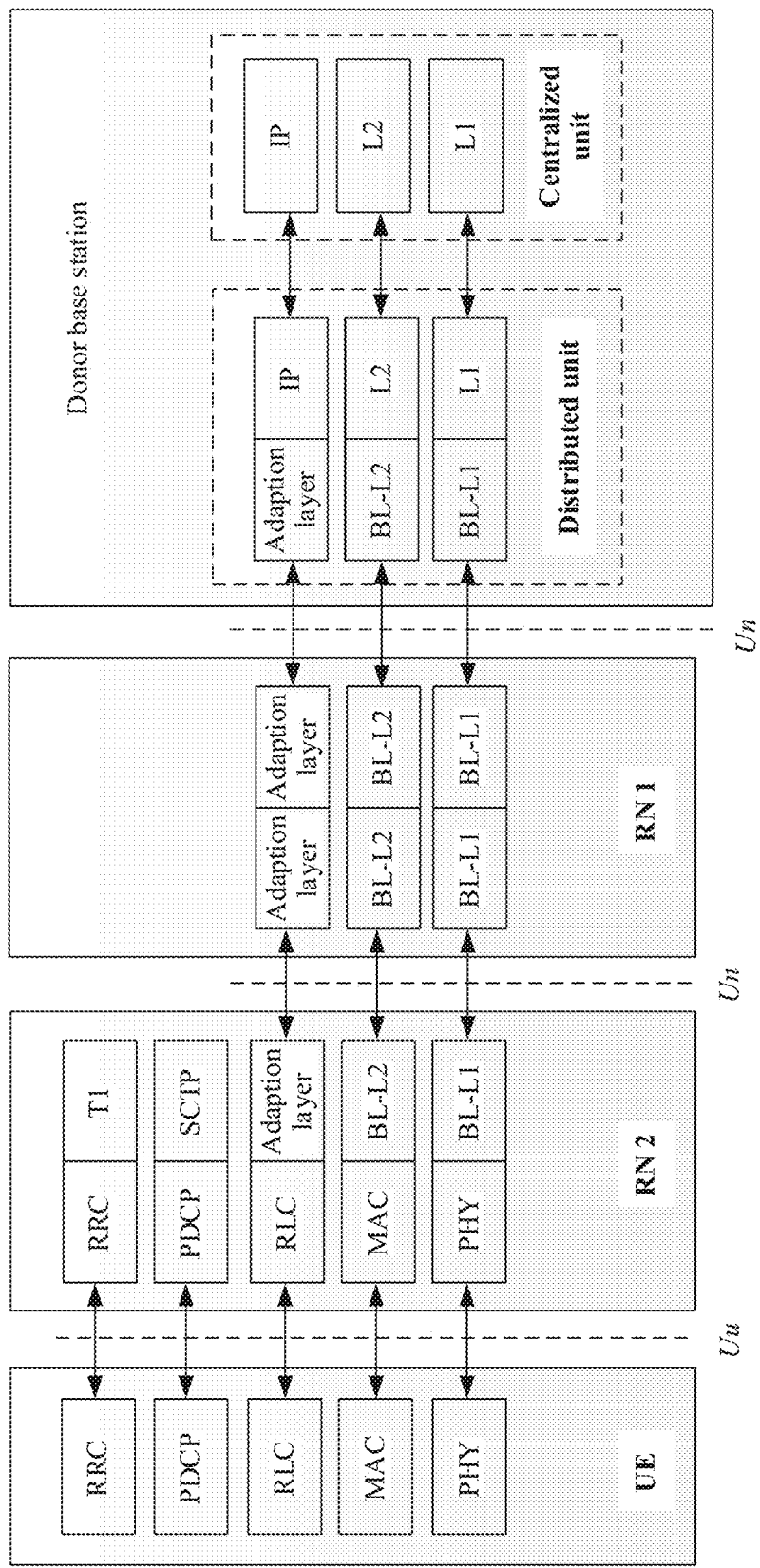
Figure 5E:
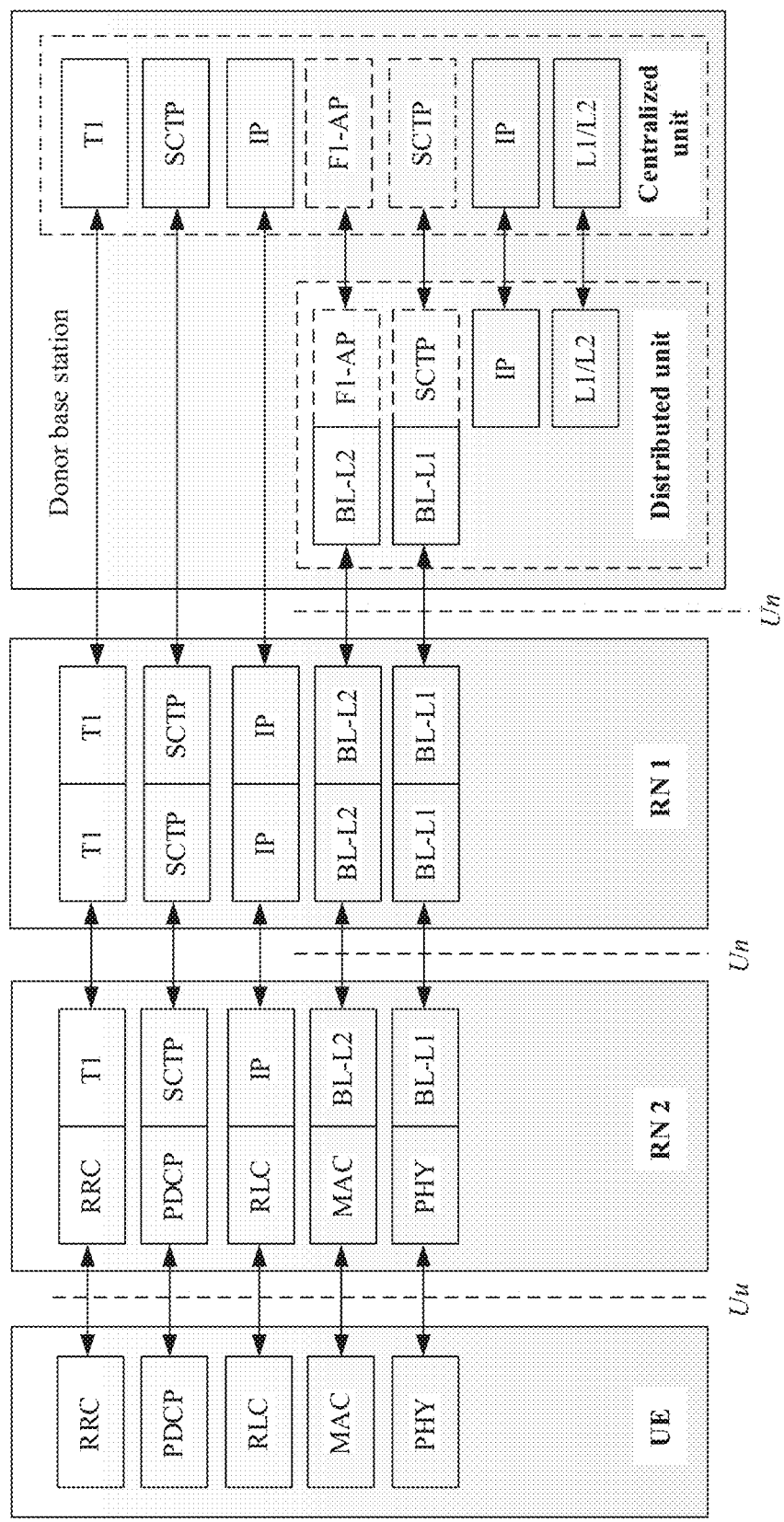

For the schematic diagram of the control plane protocol stack architecture shown in FIG. 5E, the first packet fed back by the relay node may be carried in a T1 layer message (or a PDU on a T1 layer) and sent to the second node. In this case, the second node may be another relay node or a donor base station that serves as a parent node of the relay node. Optionally, if the donor base station is in a form in which a centralized unit and a distributed unit are separated, the second node may alternatively be a centralized unit of the donor base station. Optionally, the T1 protocol layer may be, for example, an NG-AP layer, and may be configured to send information between the relay node and the second node, where the information includes control messages, for example, content such as an NG connection management related message between the relay node and the second node and configuration information of UE for an NG interface, and a name of the T1 protocol layer is not limited.

For a solution in which UE feeds back the first packet in a control layer message, in the protocol stack architectures shown in FIG. 5A, FIG. 5B, and FIG. 5C, a peer layer of an RRC protocol layer of the UE is located at the donor base station or the centralized unit of the donor base station. If the UE feeds back the first packet in a control layer RRC message (an RRC PDU), the UE sends the first packet to the donor base station or the centralized unit of the donor base station through an intermediate relay node. Alternatively, in the protocol stack architectures shown in FIG. 5D and FIG. 5E, a peer layer of an RRC protocol layer of the UE is located at a relay node (for example, the RN 2 in FIG. 5D and FIG. 5E) that provides an access service for the UE. In this case, the UE sends the first packet to the relay node (for example, the RN 2 in FIG. 5D and FIG. 5E).

Optionally, if the relay node further has a protocol stack function similar to that of the UE, the relay node may use a control layer RRC message to carry a flow control feedback message. When the relay node uses the RRC message to carry the flow control feedback information, refer to the solution in which the UE uses the control layer message to carry the flow control feedback information for understanding. A peer layer of an RRC protocol layer of the relay node may be located at a donor base station or a centralized unit of the donor base station, or another relay node (that is, a parent node of the relay node) that provides an access service for the relay node.

In addition, the protocol stacks shown in FIG. 5A to FIG. 5E may be flexibly changed based on different actual applications. For example, in FIG. 5B, in a possible design, there may be no peer SCTP layer between the RN 2 and the DgNB/donor-CU. In FIG. 5C, in a possible design, there may be no peer SCTP layer between the RN 2 and the RN 1 and between the RN 1 and the donor-DU. In FIG. 5E, there may be no peer SCTP layer between the RN 2 and the RN 1 and between the RN 1 and the donor-CU. In FIG. 5C and FIG. 5D, in a possible design, the peer Adapt layer between the RN 1 and the RN 2 may alternatively be replaced with an IP layer, and similarly, the peer Adapt layer between the RN 1 and the DgNB/the distributed unit of the donor base station may alternatively be replaced with an IP layer. In FIG. 5E, in a possible design, a peer IP layer between the RN 2 and the RN 1 or a peer IP layer between the RN 1 and the DgNB/donor-CU may be replaced with an Adapt layer. Optionally, there may be no peer GTP layer and UDP layer between the centralized unit of the donor base station and the distributed unit of the donor base station. Optionally, there may be a peer Adapt layer or IP layer between the RN 1 and the distributed unit of the donor base station above BL-L2.

In the protocol stack in this application, SDAP represents a service data adaptation protocol (Service Data Adaptation Protocol), L2 is a corresponding link layer protocol on an interface between the CU and the DU, and L1 is a corresponding physical layer protocol on an interface between the CU and the DU.

In the protocol stack in this application, BL-L2 represents a link layer protocol stack of a wireless backhaul link, and includes at least one of the following protocol layers: an SDAP layer, a PDCP layer, an RLC layer, and a MAC layer. BL-L1 indicates a physical layer protocol of the wireless backhaul link, that is, a PHY layer. Specific functions of the foregoing protocol layers depend on a communications technology (for example, an LTE technology or an NR technology) specifically used by the wireless backhaul link, and may include some or all functions of protocol layers defined in a specific communications technology. The wireless backhaul link is a link corresponding to a Un interface, and is a backhaul link between a relay node and another relay node, or a backhaul link between a relay node and a donor base station.

In the protocol stack in this application, Adapt represents an adaptation layer (adaptation layer), and may carry any one or more of the following information: information used for data packet routing, information used for QoS mapping, a data packet type indication, flow control feedback information, and the like. The Adapt layer may be above all protocol layers included in BL-L2, for example, BL-L2 includes an RLC layer and a MAC layer, and the Adapt layer is above the RLC layer. Alternatively, the Adapt layer may be between any two protocol layers included in BL-L2, for example, the Adapt layer is between an RLC layer and a MAC layer. Alternatively, the Adapt layer may be between the BL-L2 layer and the BL-L1 layer. Alternatively, a function of the Adapt layer may be extended by using functions of any layer or any of a plurality of layers included in BL-L2, and no new adaptation layer needs to be added.

The IAB networking scenario in this application may further include a scenario in which hybrid networking is performed by using a layer 2 relay and a layer 3 relay. For understanding of user plane and control plane protocol functions supported by the layer 2 relay, refer to any one of FIG. 4A to FIG. 4C and any one of FIG. 5A to FIG. 5C. For understanding of user plane and control plane protocol functions supported by the layer 3 relay, refer to any one of FIG. 4D and FIG. 4E and any one of FIG. 5D and FIG. 5E. For the layer 2 relay in hybrid networking of the two types of relays, the layer 3 relay may be considered as the DgNB in FIG. 4A. FIG. 4B, FIG. 4C, FIG. 5A, FIG. 5B, or FIG. 5C, and is used as the second node for receiving flow control feedback information of a relay or UE. For understanding, refer to a manner of sending the flow control feedback information in a corresponding figure. When the layer 3 relay sends the flow control feedback information to the second node, the layer 3 relay may be considered as the relay node in FIG. 4D, FIG. 4E, FIG. 5D, or FIG. 5E, and the second node may be another layer 3 relay, a DgNB, a donor-DU, or a donor-CU. For understanding, refer to a manner of sending the flow control feedback information in a corresponding figure.

The following describes the method shown in FIG. 2 in detail by using several relay networking scenarios.

Embodiment 2

Figure 6A:
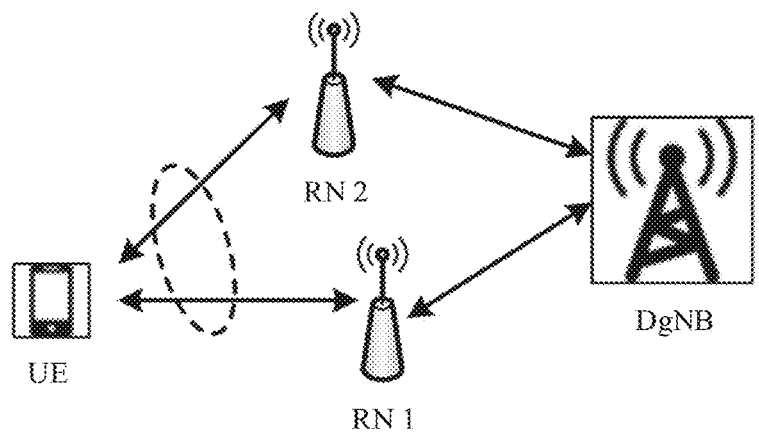
FIG. 6A and FIG. 6B are schematic diagrams of an access link multi-connectivity wireless relay networking scenario according to an embodiment of this application.
Figure 6B:
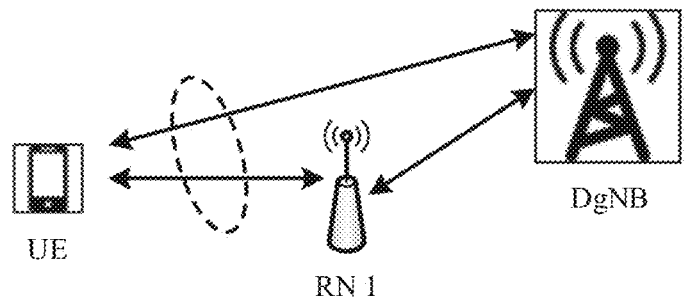

The relay networking scenario in Embodiment 2 is an access link multi-connectivity wireless relay networking scenario. For details, refer to FIG. 6A and FIG. 6B. FIG. 6A and FIG. 6B are only possible schematic diagrams of an access link multi-connectivity, and the AL multi-connectivity wireless relay networking scenario is not limited to the networking scenarios in FIG. 6A and FIG. 6B.

In the wireless relay networking scenario, there is a clear hierarchical relationship between a relay node and a relay node or a donor gNodeB (DgNB) node that provides a backhaul service for the relay node. Each relay node considers a node that provides a backhaul service for the relay node as a unique parent node. In the AL multi-connectivity wireless relay networking scenario shown in FIG. 6A, an RN 1 and an RN 2 form a dual connection to provide an access service for UE. There is an access link between the UE and each of the RN 1 and the RN 2, and parent nodes of the RN 2 and the RN 1 are both a DgNB, namely, a traffic distribution anchor (which may also be referred to as a traffic distribution point or an aggregation point). In this case, there are two optional paths for data transmission between the UE and the DgNB. A path 1 is UE-RN 1-DgNB, and a path 2 is UE-RN 2-DgNB. The DgNB may know, based on measurement, a status of a link between the DgNB and the RN 1 (that is, a backhaul link on the path 1) and a status of a link between the DgNB and the RN 2 (that is, a backhaul link on the path 2), but cannot know a status of an RN 1-UE link and a status of an RN 2-UE link. Therefore, the RN 1 needs to send flow control feedback information to enable the DgNB to learn the status of the segment of RN 1-UE link on the path 1, and the RN 2 needs to send flow control feedback information to enable the DgNB to learn the status of the segment of RN 2-UE link on the path 2, so that the DgNB makes an appropriate flow control decision based on an overall status of each segment of link included in the path 1 and the path 2.

Similarly, in the AL multi-connectivity wireless relay networking scenario shown in 6B, the RN 1 and the DgNB form a dual connection to provide an access service for the UE, and a parent node of the RN 1 is also the DgNB, namely, a traffic distribution anchor (which may also be referred to as a traffic distribution point or an aggregation point). There are two optional paths for data transmission between the UE and the DgNB. A first path is UE-DgNB, and a second path is UE-RN 1-DgNB. The DgNB may know, based on measurement, a status of a direct link between the DgNB and the UE (that is, an access link on the path 1) and a status of a link between the DgNB and the RN 1 (that is, a backhaul link on the path 2), but cannot know a status of an RN 1-UE link. Therefore, the RN 1 needs to send flow control feedback information to enable the DgNB to learn the status of the segment of RN 1-UE link on the path 2, so that the DgNB makes an appropriate flow control decision based on an overall status of each segment of link included in the path 1 and the path 2.

It should be noted that the relay node in the networking scenarios in FIG. 6A and FIG. 6B may be a layer 3 relay or a layer 2 relay. For a corresponding user plane protocol architecture, refer to an evolved protocol architecture in FIG. 4A to FIG. 4E in which the RN 1 is removed. For a corresponding control plane protocol architecture, refer to an evolved protocol architecture in FIG. 5A to FIG. 5E in which the RN 1 is removed.

The following describes content and a sending manner of flow control feedback information by using an example in which the relay node is the RN 1 in FIG. 6A. For understanding of content and a sending manner of flow control feedback information of the RN 2 in FIG. 6A and the RN 1 in FIG. 6B, refer to the RN 1 in FIG. 6A.

1. The content of the flow control feedback information that needs to be sent by the relay node RN 1 to the DgNB includes any one or more of the following information:
   (2) a buffer status at a granularity of the relay node RN 1, and optionally, an identifier of the relay node RN 1;
   (3) a buffer status that is at a granularity of a radio bearer of UE (for example, a buffer space corresponding to a UE DRB) and at the relay node RN 1, and optionally, an identifier corresponding to the radio bearer of the UE (for example, an identifier of the UE and a DRB UE ID, or GTP tunnel endpoint identifiers TEIDs that are in a one-to-one correspondence with UE DRBs);
   (4) a buffer status that is at a granularity of the UE and at the relay node RN 1, for example, a buffer space corresponding to the UE, and optionally, an identifier of the UE;
   (5) a buffer status that is at a granularity of a PDU session of the UE and at the relay node RN 1, and optionally, an identifier of the PDU session of the UE and the identifier of the UE;
   (6) a buffer status that is at a granularity of a QoS flow of the UE and at the relay node RN 1, and optionally, an identifier of the QoS flow of the UE such as a QFI (QoS flow identifier) and an identifier of the UE;
   (7) a maximum sequence number (SN) of sequence numbers of data packets already successfully sent by the relay node RN 1 to the UE, where the sequence number may be a sequence number that is allocated by the DgNB and that can be identified by the relay node RN 1; optionally, the sequence number may be further identified by the UE, and for example, the sequence number is an SN carried in a PDCP protocol data unit (PDU), namely, a PDCP SN, or is an SN carried in an RLC service data unit (SDU)/RLC PDU, namely, an RLC SN;
   (8) a sequence number of a data packet that the relay node RN 1 considers to be lost or that is not fed back to the DgNB, where the sequence number is a sequence number that can be identified at both the DgNB and the RN 1 and that is consecutively numbered on a link between the DgNB and the RN 1; for example, in the scenario shown in FIG. 6A, the sequence number may be a sequence number allocated by the traffic distribution anchor DgNB to a data packet, the sequence number is consecutively numbered on some links (for example, a backhaul link between the DgNB and the RN 1) included in the traffic distribution path 1, and the sequence number may be carried in a processing process of a newly added protocol layer (for example, an adaptation layer) (that is, carried in a packet Adapt PDU processed on the adaptation layer), or carried in a processing process of the GTP layer (that is, carried in a packet GTP PDU processed on the GTP layer), or in a scenario in which there is no multipath traffic distribution, the sequence number may be a PDCP SN, an RLC SN, or the like allocated by the DgNB;
   (9) link quality information, which is link quality information of an access link (RN 1-UE) herein, where optionally, the link quality information includes at least one of an uplink and/or downlink reference signal received power (RSRP), reference signal received quality (RSRQ), a received signal strength indicator (RSSI), and a signal to interference plus noise ratio (SINR);
   (10) a link bandwidth or transmission rate, which is an available/average bandwidth or transmission rate on the access link (RN 1-UE), where the available/average bandwidth or transmission rate may correspond to a granularity of a relay node (that is, a granularity of the RN 1), a granularity of a cell serving the UE, the granularity of the radio bearer of the UE, the granularity of the PDU session of the UE, or the granularity of the QoS flow of the UE; and optionally, a specifically corresponding identifier of the RN 1, identifier of the cell that is served by the RN 1 and that serves the UE, identifier of the UE, identifier corresponding to the radio bearer of the UE, identifier of the PDU session of the UE, or identifier of the QoS flow of the UE;
   (11) a load degree indication of the relay node RN 1, for example, a load degree evaluation value obtained by considering a sum of traffic volumes of all UEs served by the relay node RN 1, which may be a level indication with a limited value range, where the indication may be used by an upper-level node such as a donor base station to determine whether a quantity of resources needs to be adjusted for the RN 1, and whether a network topology or a routing policy needs to be adjusted, and the resources may be radio transmission resources in dimensions of time, frequency, space, and the like;
   (12) an average/minimum transmission delay of the link, for example, an average/minimum unidirectional transmission delay (uplink and/or downlink) of an access link, or an average/minimum round trip time RTT of the access link; and
   (13) an average/minimum wait time of the data packet at the relay node RN 1, which may be, for example, obtained by the relay node RN 1 by counting wait time periods of receiving data packets by the relay node RN 1, where a wait time period $T=T_S-T_R$, $T_R$ represents a time point at which the relay node RN 1 receives a data packet, and $T_s$ represents a time point at which the relay node RN 1 sends the data packet.

2. Feedback Triggering Manner of the Flow Control Feedback Information

Sending the flow control feedback information by the relay node RN 1 to the DgNB may be periodically performed or triggered by a trigger event. The trigger event includes, for example, blockage or resume of an access link, a buffer status that is at a specific granularity and at the RN 1 and that exceeds or is less than a threshold, that the relay node RN 1 detects that a data packet is lost on a link between the RN 1 and the DgNB, and the like. A periodicity and the trigger event of the flow control feedback information may be sent by a core network device or the DgNB to the relay node RN 1 in configuration information, or may be determined through negotiation between the RN 1 and the DgNB.

3. Manner of Sending the Flow Control Feedback Information

In a possible design, if the GTP transmission tunnels that are in the one-to-one correspondence with the DRBs of the UE are established between the relay node RN 1 and the DgNB for sending user plane data packets, the relay node RN 1 and the DgNB may identify the UE and the DRBs of the UE based on the GTP tunnel endpoint identifiers, the flow control feedback information may be carried in a GTP packet (that is, a GTP PDU), and if the foregoing feedback content includes information about the granularity of the radio bearer of the UE (for example, the buffer status at the granularity of the radio bearer of the UE or the link bandwidth/transmission rate), the identifier of the radio bearer of the UE does not need to be additionally carried. If the GTP tunnels between the DgNB and the relay node are in a one-to-one correspondence with PDU sessions of the UE instead of the DRBs of the UE, if the flow control feedback information is carried in the GTP packet and when the foregoing feedback content includes the information about the granularity of the radio bearer of the UE (for example, the buffer status at the granularity of the radio bearer of the UE or the link transmission rate/bandwidth), the identifier of the radio bearer of the UE needs to be further carried.

In another possible design, if information used for routing and information used for QoS mapping (including, for example, a UE ID, a UE DRB ID, a logical channel ID of the UE, a QoS flow ID, and a PDU session ID) are carried based on an adaptation layer between the relay node and the DgNB, the flow control feedback information may be carried in header information added to the adaptation layer, or a new special packet of the adaptation layer (for example, an adaptation layer control PDU) is defined to specially carry the flow control feedback information. The newly defined special packet of the adaptation layer may carry special packet indication information, used to indicate that the packet is a packet that includes the flow control feedback information.

In another possible design, the relay node RN 1 may send the flow control feedback information to the DgNB in a control layer packet, where the control layer packet may be, for example, an RRC message, or a message of a peer T1 protocol layer between the relay node RN 1 and the DgNB, or the like.

A specific manner of carrying the flow control feedback information may be understood based on a protocol architecture between the relay node and the DgNB with reference to the plurality of manners of sending the first packet described in Embodiment 1.

Optionally, the packet that includes the flow control feedback information and is sent by the relay node RN 1 may further carry a destination address of the flow control feedback information, that is, an identifier of a node that needs to receive the flow control feedback information, for example, an identifier of the DgNB in this embodiment. Optionally, the packet including the flow control feedback information may further include first indication information, used to indicate that the packet is a packet including the flow control feedback information.

After receiving the flow control feedback information sent by the relay node, the donor base station node DgNB may determine or adjust, based on content in the flow control feedback information, a traffic distribution ratio/sending rate at a specific granularity on each link. For example, if the flow control feedback information that is sent by the relay node and that is received by the DgNB includes a status of a remaining buffer space corresponding to the UE DRB 1, the DgNB may control an amount of data that is of the UE DRB 1 and that is sent by the DgNB to the relay node not to exceed (less than or equal to) a size of the remaining buffer space. A specific manner and method for performing flow control by the traffic distribution anchor are not limited in this application.

Based on the foregoing solution, in a single-hop relay networking scenario, the flow control feedback information is sent, so that the upper-level node DgNB can learn of a status of the RN 1-UE access link, and perform flow control at a specific granularity (for example, the granularity of the radio bearer of the UE, the granularity of the UE, or the granularity of the QoS flow of the UE) in time, for example, adjust a sending rate, to prevent the RN 1-UE link from being in a congested or hungry state. In addition, in a multi-connectivity relay networking scenario, the relay node feeds back a flow control information packet to the traffic distribution anchor DgNB, so that the traffic distribution anchor DgNB can perform flow control at a specific granularity (for example, the granularity of the RN, the granularity of the radio bearer of the UE, the granularity of the UE, or the granularity of the QoS flow of the UE) based on a status of a traffic distribution link, thereby properly distributing traffic among a plurality of links.

Embodiment 3

A relay networking scenario in Embodiment 3 is a multi-hop relay networking scenario. For details, refer to FIG. 7A. FIG. 7B, and FIG. 7C.

Figure 7A:
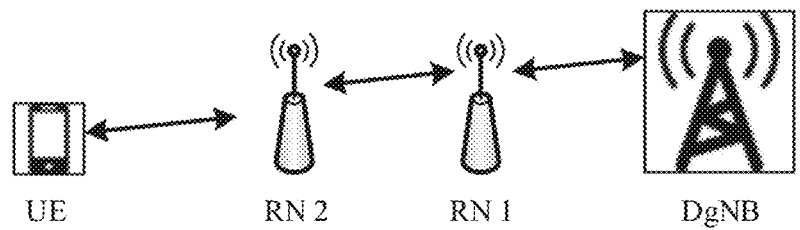
FIG. 7A, FIG. 7B, and FIG. 7C are schematic diagrams of a multi-hop wireless relay networking scenario according to an embodiment of this application.
Figure 7B:
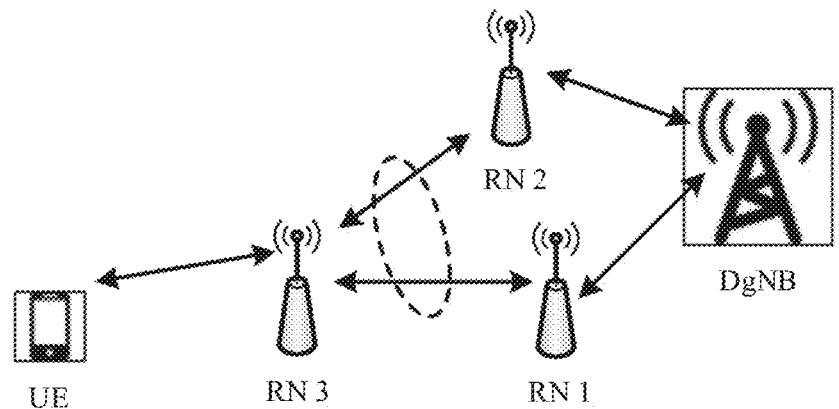
Figure 7C:
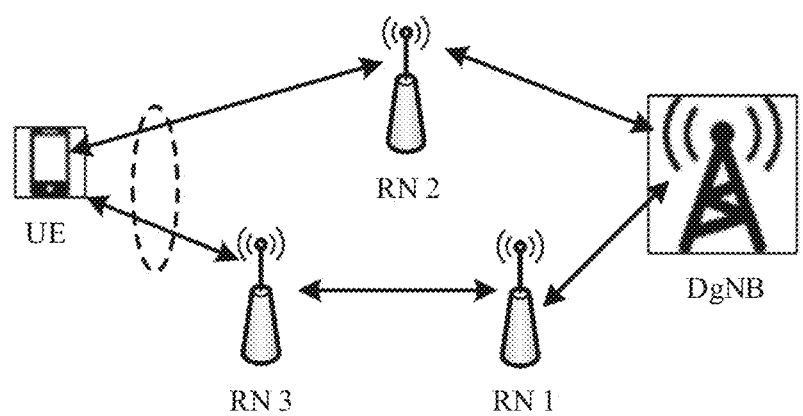

In a multi-hop relay networking scenario shown in FIG. 7A, a path between UE and a DgNB is UE-RN 2-RN 1-DgNB. Therefore, if the donor base station DgNB can learn of statuses of two links, namely, RN 2-UE and RN 1-RN 2, the DgNB may make a flow control decision at a specific granularity as required.

In a multi-hop and backhaul link multi-connectivity networking scenario shown in FIG. 7B, a DgNB used as a traffic distribution anchor also needs to know link statuses of a plurality of downstream links (UE-RN 3, RN 3-RN 1. RN 3-RN 2) on two paths between the DgNB and UE (where a path 1 is UE-RN 3-RN 1-DgNB and a path 2 is UE-RN 3-RN 2-DgNB), so that the DgNB makes a flow control decision at a specific granularity as required.

In a multi-hop and access link multi-connectivity networking scenario shown in FIG. 7C, there are two paths between UE and a DgNB. One path is a path 1: UE-RN 3-RN 1-DgNB, which is a multi-hop relay link. The other path is a path 2: UE-RN 2-DgNB. A traffic distribution anchor between the two paths is the DgNB. In this case, on the path 2, for understanding of a manner in which the RN 2 feeds back a flow control information packet to the DgNB, refer to the description in Embodiment 2. On the path 1, flow control information packets of a plurality of links are to be fed back because there is a multi-hop relay. For the traffic distribution anchor DgNB, the DgNB can learn of a status of a backhaul link between the DgNB and the RN 1, but cannot learn of statuses of an RN 1-RN 3 link and an RN 3-UE link. However, the two links are used as a part of the path 1, and the statuses of the two links affect transmission of a data packet on the path 1.

It should be noted that the relay node in the architectures in FIG. 7A, FIG. 7B, and FIG. 7C may be a layer 3 relay or a layer 2 relay. For a corresponding user plane protocol architecture, refer to that in FIG. 4A to FIG. 4E. For a corresponding control plane protocol architecture, refer to that in FIG. 5A to FIG. 5E.

The following describes content and a sending manner of flow control feedback information by using an example in which the relay node is the RN 3 and the RN 1 on the link 1 in FIG. 7C. For understanding of functions related to the RN 1 in FIG. 7A and the RN 1 and the RN 2 in FIG. 7B in sending or receiving flow control feedback information, refer to corresponding descriptions of the RN 1 in FIG. 7C. For understanding of functions related to the RN 2 in FIG. 7A and the RN 3 in FIG. 7B in sending or receiving flow control feedback information, refer to corresponding descriptions of the RN 3 in FIG. 7C.

1. The Content of the Flow Control Feedback Information that Needs to be Sent by the Relay Node RN 1 to a DgNB In Embodiment 3, first, the RN 3 needs to send flow control feedback information 1 to the RN 1. For content, a triggering manner, and a sending manner of the flow control feedback information 1, refer to the description in Embodiment 2. During understanding, the DgNB in Embodiment 2 is replaced with the RN 1 in this embodiment, and the RN 1 in Embodiment 2 is replaced with the RN 3 in this embodiment.

For the flow control feedback information 1 sent by the RN 3, the RN 1 may directly forward the flow control feedback information 1 to the DgNB, or send flow control feedback information 2 that is generated by the RN 1 and that carries the content in the flow control feedback information 1 to the DgNB.

Specifically, the flow control feedback information 2 sent by the RN 1 to the DgNB may include the content in the flow control feedback information 1 and/or flow control feedback information in which an RN 1-RN 3 link is described. Content of the flow control feedback information in which the RN 1-RN 3 link is described includes at least one of the following information:

(1) an indication of a link status, where the indication of the link status is an indication of a link status of a backhaul link (RN 1-RN 3), and the link status includes any one of two link statuses: link blockage and link resume;

(2) a buffer status that is at a granularity of the RN 1 and at the relay node RN 1, and optionally, an identifier of the relay node RN 1;

(3) a buffer status that is at a granularity of a child node of the RN 1 and at the relay node RN 1, and optionally, an identifier of the child node of the RN 1; for example, in FIG. 7C, the RN 3 is a child node of the RN 1, and therefore, the flow control feedback information 2 sent by the RN 1 may include summary information of a buffer status related to the RN 3 at the RN 1 and an identifier of the RN 3;

(4) a buffer status that is at a granularity of a radio bearer of the child node of the RN 1 and at the relay node RN 1, and optionally, the identifier of the child node of the RN 1 and an identifier of the radio bearer; for example, in FIG. 7C, the RN 3 is the child node of the RN 1, and therefore, the flow control feedback information 2 sent by the RN 1 may include a buffer status of a radio bearer of the RN 3 (or a radio bearer on an interface between the RN 1 and the RN 3), an identifier of the RN 3, and an identifier of the radio bearer;

(5) a buffer status that is at a granularity of a radio bearer of UE (for example, a buffer space corresponding to a UE DRB) and at the relay node RN 1, and optionally, an identifier corresponding to the radio bearer of the UE (for example, an identifier of the UE and a DRB UE ID, or GTP tunnel endpoint identifiers TEIDs that are in a one-to-one correspondence with UE DRBs);

(6) a buffer status that is at a granularity of the UE and at the relay node RN 1, and optionally, an identifier of the UE;

(7) a buffer status that is at a granularity of a PDU session of the UE and at the relay node RN 1, and optionally, the identifier of the UE and an identifier of the PDU session of the UE;

(8) a buffer status that is at a granularity of a QoS flow of the UE and at the relay node RN 1, and optionally, the identifier of the UE and an identifier of the QoS flow of the UE such as a QFI;

(9) a maximum sequence number of sequence numbers of data packets already successfully sent by the relay node RN 1 to a child node (for example, the RN 3) of the relay node RN 1 or the UE, where the sequence number may be allocated by the DgNB and can be identified by the relay node RN 1; optionally, the sequence number may be further identified by a child node (for example, the RN 3) of the relay node or the UE; and for example, the sequence number is an SN carried in a PDCP protocol data unit, namely, a PDCP SN, or is an SN carried in an RLC SDU/PDU, namely, an RLC SN;

(10) a sequence number of a data packet that the relay node RN 1 considers to be lost or that is not fed back to the DgNB, where the sequence number is a sequence number that can be identified at both the DgNB and the RN 1 and that is consecutively numbered on a link between the DgNB and the RN 1; for example, in the scenario shown in FIG. 7C, the sequence number may be a sequence number allocated by the traffic distribution anchor DgNB to a data packet, the sequence number is consecutively numbered on some links (for example, an RN 3-RN 1-DgNB link or an RN 1-DgNB link) included in a traffic distribution path, and the sequence number may be carried in a processing process of a newly added protocol layer (for example, an adaptation layer) (that is, carried in a packet Adapt PDU processed on the adaptation layer), or carried in a processing process of the GTP layer (that is, carried in a packet GTP PDU processed on the GTP layer), or in a scenario in which there is no multipath traffic distribution, the sequence number may be a PDCP SN, an RLC SN, or the like allocated by the DgNB;

(11) link quality information, where the link quality information is quality information of a backhaul link (represented by RN 1-RN 3 below) between the RN 1 and the RN 3, and optionally, information indicating a specific link segment, where for example, an identifier of the RN 3 is used to indicate that the link quality information corresponds to the RN 1-RN 3 link; the backhaul link quality information may include at least one of an uplink and/or downlink RSRP, RSRQ, an RSSI, and an SINR of the link; and specifically, the RN 1 may obtain link quality information of an RN 3→RN 1 uplink through measurement, and the RN 1 may learn of link quality information of an RN 1→RN 3 downlink through a measurement report sent by the RN 3 to the RN 1;

(12) a link bandwidth or transmission rate, where the link bandwidth or transmission rate is an available/average bandwidth or transmission rate at the granularity of the RN 1/a granularity of a cell served by the RN 1 by which the RN 3 is served/a granularity of the RN 3/a granularity of a radio bearer of the RN 3/the granularity of the UE/the granularity of the radio bearer of the UE/the granularity of the PDU session of the UE/the granularity of the QoS flow of the UE; and optionally, a specifically corresponding identifier of the RN 1/identifier of the cell served by the RN 1 by which the RN 3 is served/identifier of the RN 3/identifier of the radio bearer of the RN 3/identifier of the UE/identifier corresponding to the radio bearer of the UE/identifier of the PDU session of the UE/identifier of the QoS flow of the UE on a backhaul link (for example, RN 1-RN 3) between the relay node RN 1 and a child node of the relay node RN 1;

(13) a load degree indication of the relay node RN 1, for example, an evaluation value obtained by considering a sum of traffic volumes of all UEs that is transmitted by the relay node RN 1, which may be a level indication with a limited value range, where the indication may be used by an upper-level node such as a donor base station to determine whether a quantity of resources needs to be adjusted for the RN 1, and whether a network topology or a routing policy needs to be adjusted, and the resources may be transmission resources in dimensions of time, frequency, space, and the like;

(14) an average/minimum transmission delay of a link, for example, an average/minimum unidirectional transmission delay (uplink and/or downlink) of a backhaul link between the relay node RN 1 and a child node RN 3 of the relay node RN 1, or an average/minimum round trip time RTT of the backhaul link between the RN 1 and the RN 3; and

(15) an average/minimum wait time of the data packet at the relay node RN 1, which may be, for example, obtained by the RN 1 by counting wait time periods of receiving data packets by the relay node RN 1, where a wait time period $T=T_S-T_R$, $T_R$ represents a time point at which the RN 1 receives a data packet, and $T_S$ represents a time point at which the RN 1 sends the data packet.

2. Feedback Triggering Manner of the Flow Control Feedback Information

The RN 1 sends the flow control feedback information 2 to the DgNB, where the flow control feedback information 2 may be periodically sent to the DgNB, or may be triggered by a trigger event. The trigger event includes, for example, blockage or resume of an RN 1-RN 3 access link, the flow control feedback information 1 that is received by the RN 1 from the RN 3, a buffer status that is at a specific granularity and at the RN 1 and that exceeds or is less than a threshold, that the relay node RN 1 detects that a data packet is lost on a link between the RN 1 and the DgNB, and the like. A periodicity and the trigger event of the flow control feedback information may be sent by a core network device or the DgNB to the RN 1 in the configuration information, or may be determined through negotiation between the RN 1 and the DgNB.

It should be noted that, for understanding of the triggering manner of sending the flow control feedback information 1 by the RN 3 to the RN 1, refer to the feedback triggering manner in Embodiment 2. The flow control feedback information 1 may be sent periodically or sent by being triggered by a trigger event.

3. Manner of Sending the Flow Control Feedback Information (1) For a manner of sending the flow control feedback information 1 by the RN 3 to the RN 1, refer to the three manners in Embodiment 2. It should be noted that, a packet that includes the flow control feedback information 1 and that is sent by the relay node RN 3 may include an identifier of a destination node of the flow control feedback information 1, that is, an identifier of a node that needs to receive the flow control feedback information 1, for example, an identifier of the RN 1, an identifier of the DgNB, or the like in this embodiment. Optionally, the packet including the flow control feedback information 1 may further include first indication information, used to indicate that the packet is a packet including the flow control feedback information.

(2) For a manner of sending the flow control feedback information 2 by the RN 1 to the DgNB, refer to the three manners in Embodiment 2 either. To be specific, the flow control feedback information 2 is carried in a GTP data packet, or the flow control feedback information 2 is carried in adaptation layer information (for example, an adaptation layer control PDU or adaptation layer header information), or the flow control feedback information is carried in a control layer packet such as an RRC message or a T1 protocol layer message. Regardless of any one of the foregoing manners, the packet that includes the flow control feedback information 2 and that is sent by the RN 1 may include an identifier of a destination node of the flow control feedback information 2, for example, the identifier of the DgNB. Optionally, the packet including the flow control feedback information 2 may further include first indication information, used to indicate that the packet is a packet including the flow control feedback information.

Further, if a node that receives the flow control feedback information is not the destination node for receiving the flow control feedback information or a unique destination node, the node sends received flow control feedback information to the destination node. Whether a current node is the destination node or the unique destination node may be specifically determined by using a destination node identifier in a data packet that carries the flow control feedback information. For example, if a destination node identifier in the data packet that carries the flow control feedback information is an identifier of the current node, the current node is the destination node. For another example, if a destination node identifier in a data packet that carries the flow control feedback information is a multicast address identifier, and the multicast address identifier corresponds to a group member node, where the group member node includes the current node, the current node is not the unique destination node, and the current node may continue to send received flow control feedback information to another member node corresponding to the multicast address identifier. Alternatively, whether the current node is the destination node or the unique destination node may be determined by using first indication information in a data packet. For example, if the first indication information carried in the data packet indicates that carried content is the flow control feedback information, and the current node is a node that can make a flow control decision, the current node is the destination node; if a parent node of the current node is a node that makes a flow control decision, the parent node is the destination node.

If a node that receives the flow control feedback information can make a flow control decision, the node may adjust, based on content in the flow control feedback information, a traffic distribution ratio/sending rate at a specific granularity on each link. For example, if a report received by the DgNB indicates that a segment of link (for example, RN 1-RN 3) is in an outage state, before the segment of link resumes, the DgNB no longer sends any data packet of UE directly or indirectly served by the RN 3 to the RN 1, or the DgNB actively updates a network topology to establish a connection to the RN 3 by using another node. A specific manner and method for performing flow control by the node are not limited in this application.

Feedback of flow control information in a multi-hop wireless relay network can be implemented by using the foregoing solution, so that a node having a flow control decision capability, for example, the DgNB, can learn of a status of each segment of link included in each path between the node and UE. Therefore, flow control at a specific granularity (for example, a granularity of a radio bearer of the UE or a granularity of the UE or a granularity of a radio bearer of a relay or a granularity of a relay node) can be performed in time. For example, a data sending rate of a node or a segment of link on a path is adjusted, to prevent some nodes or links on the path from being in a congested or hungry state. In addition, in a multi-connectivity relay networking scenario, a relay node feeds back a flow control information packet to a traffic distribution anchor such as a DgNB or another relay node, so that the traffic distribution anchor can learn of a status of each segment of link related to different paths, to facilitate flow control performed at a specific granularity, and adjust a service or traffic on different paths or links more properly.

Embodiment 4

In Embodiment 4, a multi-hop and multi-connectivity access link networking scenario is considered. Specifically, referring to FIG. 8, there is an access link between UE and both an RN 2 and an RN 1, parent nodes of the RN 1 and the RN 2 are the RN 3, and a parent node of the RN 3 is a DgNB. There are two paths between the DgNB and the UE. A path 1 is UE-RN 1-RN 3-DgNB and a path 2 is UE-RN 2-RN 3-DgNB. The RN 3 is a traffic distribution anchor or a convergence point between the path 1 and the path 2.

A network topology between the UE and the RN 3 is the same as the network topology shown in FIG. 7A. Therefore, the RN 2 and the RN 1 send flow control feedback information 1 of respective access links to the RN 3. For understanding of this, refer to the description in Embodiment 2. During understanding, the DgNB in Embodiment 2 is replaced with the RN 3 in this embodiment, and details are not described herein again.

After receiving the flow control feedback information 1 sent by the RN 1 or the RN 2, the RN 3 may forward the flow control feedback information 1 to the DgNB, or the RN 3 sends flow control feedback information 2 that carries the flow control feedback information 1 to the DgNB, where the flow control feedback information 2 may include any one or more of flow control feedback information sent by the RN 1, flow control feedback information sent by the RN 2, flow control feedback information in which an RN 1-RN 3 link is described, or flow control feedback information in which an RN 2-RN 3 link is described. For understanding of content of the flow control feedback information in which the RN 1-RN 3 link is described, refer to the description in Embodiment 3. During understanding, the RN 1 and the RN 3 in a corresponding description in Embodiment 3 need to be interchanged. For understanding of content of the flow control feedback information in which the RN 2-RN 3 link is described, refer to the description of the content of the flow control feedback information in which the RN 1-RN 3 link is described in Embodiment 3. During understanding, the RN 1 in the corresponding description in Embodiment 3 needs to be replaced with the RN 3 in this embodiment, and the RN 3 in Embodiment 3 needs to be replaced with the RN 2 in this embodiment.

In this embodiment, there is only one link between the RN 3 and the DgNB. If the RN 3 can make a flow control decision, the DgNB may not need to know statuses of segments of links of two paths (that is, RN 3-RN 2-UE and RN 3-RN 1-UE) from the RN 3 to the UE. Therefore, besides the foregoing manner, from a perspective of reducing flow control feedback overheads, the RN 3 may alternatively summarize some content in the flow control feedback information related to the two links, and then feed back the summarized content to the DgNB. To be specific, the RN 3 may summarize some content included in the flow control feedback information 2, then generate new flow control feedback information 2 by using a summarized result and other content that does not need to be summarized, and send the new flow control feedback information 2 to the DgNB. In the scenario shown in FIG. 8, if the flow control feedback information 2 fed back by the RN 3 to the DgNB includes a buffer status at a granularity of UE/a radio bearer of the UE/a PDU session of the UE-a QoS flow of the UE, the RN 3 may not feed back buffer statuses at nodes to the DgNB one by one, but instead, the RN 3 summarizes information and then sends the summarized information to the DgNB. For example, the flow control feedback information 2 fed back by the RN 3 includes summary information of remaining buffer spaces corresponding to a UE DRB 1, that is, $L_3 + \Sigma_i L_{ij}$, where i is a reference index of a transmission path between the RN 3 and the UE, j is an identifier of a relay node other than the RN 3 on the $i^{th}$ path, $L_{ij}$ is a remaining buffer space that corresponds to the UE DRB 1 and that is at the $j^{th}$ node on the $i^{th}$ transmission path, L3 is a remaining buffer space that corresponds to the UE DRB 1 and that is at the RN 3, and $\Sigma\{\ \}$ is a summation operation. Similarly, the flow control feedback information 2 fed back by the RN 3 may further include summary information of buffer statuses at other granularities (such as the granularity of the UE, the granularity of the PDU session of the UE, and the granularity of the QoS flow of the UE), and the buffer statuses may further include other content. For details, refer to related descriptions in Embodiment 1. Optionally, a link bandwidth or transmission rate in the flow control feedback information 2 sent by the RN 3 to the DgNB may be summary information of available/average bandwidths or transmission rates of links between the RN 3 and the UE, for example, $\Sigma_i \min_j\{R_{ij}\}$, where i is a reference sign of a transmission link between the RN 3 and the UE, j is an identifier of a relay node (including the RN 3) on the $i^{th}$ link, $R_{ij}$ may be understood as an available bandwidth or transmission rate of a link between the node j and a child node of the node j on the $i^{th}$ transmission link, and $\min\{\ \}$ is an operation of obtaining a minimum value. Optionally, the flow control feedback information 2 sent by the RN 3 to the DgNB includes an average/minimum transmission delay of a link, and may be summary information of average/minimum delays of links between the RN 3 and the UE, for example, $\min_{\{i=1, 2, \ldots\}} \Sigma_i \Sigma_j \{T_{ij}\}$, where i is a reference sign of a transmission link between the RN 3 and the UE, j is an identifier of a relay node (also including the RN 3) on the $i^{th}$ link, and $T_{ij}$ may be understood as an average/minimum unidirectional transmission delay or a round-trip delay of a link between the node j and a child node of the node j on the $i^{th}$ transmission link.

For understanding of the feedback triggering manner of the flow control feedback information and the sending manner of the flow control feedback information in this embodiment, refer to a corresponding description in Embodiment 3. During understanding, the RN 1 in the corresponding description in Embodiment 3 may be replaced with the RN 3 in this embodiment, and the RN 3 in the corresponding description in Embodiment 3 may be replaced with the RN or the RN 2 in this embodiment.

Based on the foregoing solution, the relay node RN 3 serving as a traffic distribution node/aggregation node summarizes flow control information of a child node, and feeds back the summarized flow control information to a DgNB, thereby reducing feedback overheads. Alternatively, the RN 3 may further learn, based on the flow control feedback information sent by the child node RN 1 and/or the child node RN 2, of a status of each segment of link on two paths between the RN 3 and UE, to perform flow control at a specific granularity when necessary.

It should be noted that the DgNB in Embodiment 2 to Embodiment 4 of this application may be a complete function entity. In other words, a donor base station in a form in which a centralized unit and a distributed unit are separated is not considered. Optionally, the DgNB may alternatively be in a form in which the centralized unit and the distributed unit are separated. In this case, functions of the DgNB in Embodiment 2 to Embodiment 4 may be replaced by functions of a corresponding distributed unit (Donor-DU) of the donor base station and/or a corresponding centralized unit (Donor-CU) of the donor base station.

Embodiment 5

A difference between an application scenario of Embodiment 5 and application scenarios of the first three embodiments lies in that a feedback manner in which the relay node sends of the flow control feedback information is used in the first three embodiments, but the UE sends the flow control feedback information in Embodiment 5.

1. Content of the Flow Control Feedback Information May Include at Least One of the Following Information:

(1) an indication of a link status, which is an indication of a link status of an access link, and the link status includes any one of two link statuses: link blockage and link resume, where if UE has a plurality of access links, it is also necessary to specify a link that is used (where for example, an identifier of an accessed relay node or an identifier of an accessed cell is carried);

(2) a maximum value of a sequence number of a data packet received by the UE, where the sequence number may be, for example, a PDCP SN or an RLC SN:

(3) a sequence number of a data packet that the UE considers to be lost or that is not successfully received, where the sequence number is a sequence number that can be identified at both the UE and a relay node RN or a DgNB that provides an access service for the UE and is consecutively numbered on a link between the UE and the relay node RN or the DgNB, and the sequence number may be, for example, a PDCP SN or an RLC SN:

(4) link quality information, which is link quality information of an access link herein; optionally, the link quality information includes at least one of an uplink and/or downlink RSRP, RSRQ, an RSSI, an SINR, and a transmission rate of a link (for example, an average transmission rate of the link within a period of time); and (5) an average/minimum transmission delay of the link, which is an average/minimum unidirectional transmission delay or round-trip delay of the access link.

2. Feedback Triggering Manner of the Flow Control Feedback Information

Sending the flow control feedback information by the UE to the DgNB or the relay node may be periodically performed or triggered by a trigger event. The trigger event includes, for example, blockage or resume of an access link, that the UE detects that a data packet is lost (where for example, a reordering timer expires) on the access link, or the like. A periodicity and the trigger event of the flow control feedback information may be sent by a core network device or the DgNB or the relay node to the UE in configuration information.

3. Manner of Sending the Flow Control Feedback Information

The UE may use a control layer RRC message or a PDCP PDU (for example, a PDCP status report) to carry the flow control feedback information, and a destination node of the flow control feedback information is a node in which a PDCP layer of the UE and/or a peer layer of an RRC layer are/is located. For example, in the IAB network protocol architecture shown in FIG. 4A, FIG. 4B, or FIG. 4C, the peer layer of the PDCP protocol layer of the UE is located at the donor base station DgNB or the centralized unit Donor-CU of the donor base station. If the UE uses the PDCP PDU to carry the flow control feedback information, the UE sends the flow control feedback information to the DgNB or the Donor-CU through at least one relay node. Alternatively, in the IAB network protocol architecture shown in FIG. 4D or FIG. 4E, the peer layer of the PDCP protocol layer of the UE is located at the relay node (for example, the RN 2 in the figure). If the UE uses the PDCP PDU to carry the flow control feedback information, the UE sends the flow control feedback information to the relay node RN 2. Alternatively, in the IAB network protocol architecture shown in FIG. 5A, FIG. 5B, or FIG. 5C, the peer layer of the RRC protocol layer of the UE is located at the donor base station DgNB or the centralized unit Donor-CU of the donor base station. If the UE uses the control layer RRC message (RRC PDU) to carry the flow control feedback information, the UE sends the flow control feedback information to the DgNB or the Donor-CU by using at least one relay node. Alternatively, in the AB network protocol architecture shown in FIG. 5D or FIG. 5E, the peer layer of the RRC protocol layer of the UE is located at the relay node (for example, the RN 2 in the figure). If the UE uses the RRC message to carry the flow control feedback information, the UE sends the flow control feedback information to the relay node RN 2.

Figure 8:
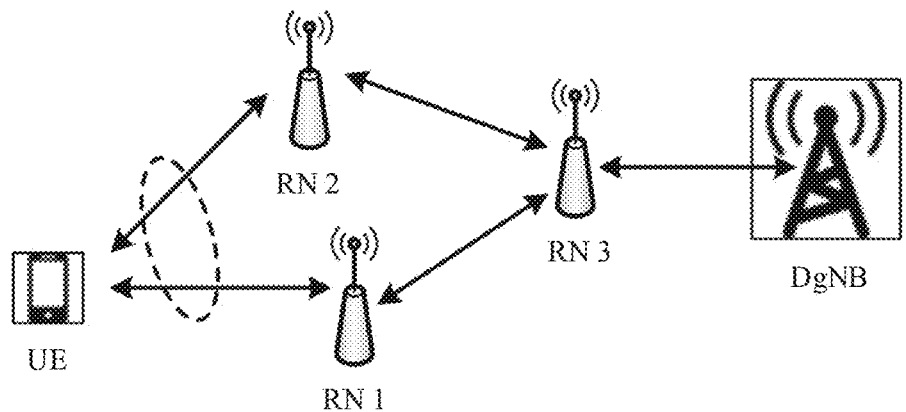
FIG. 8 is a schematic diagram of a multi-hop and access link multi-connectivity wireless relay networking scenario according to an embodiment of this application.
Figure 9:
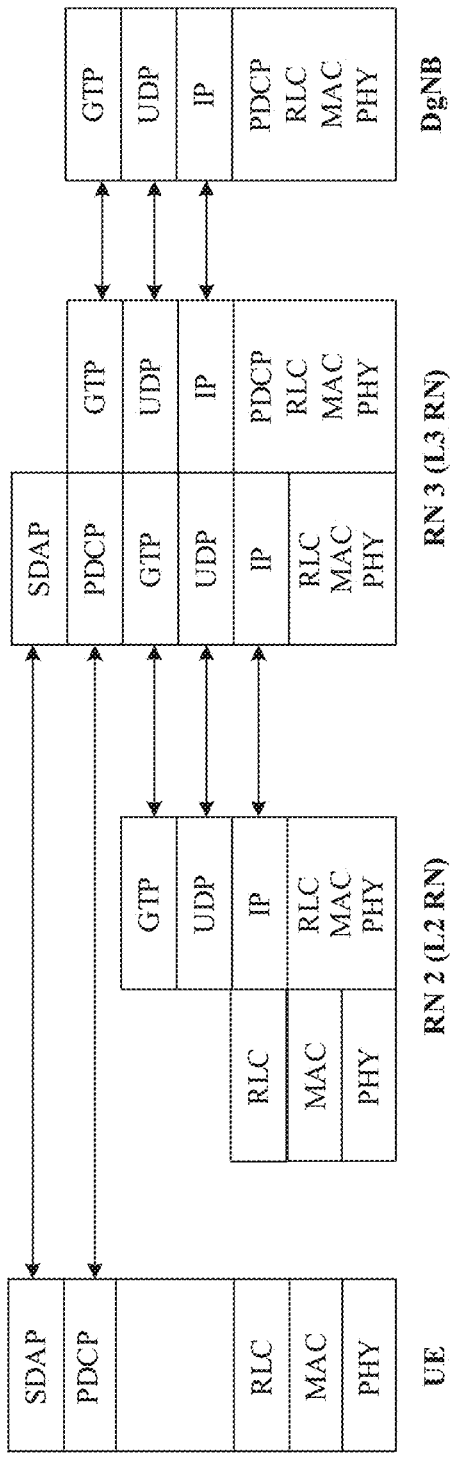
FIG. 9 is a schematic diagram of a multi-hop user plane and control plane protocol architecture according to an embodiment of this application.
Figure 9:
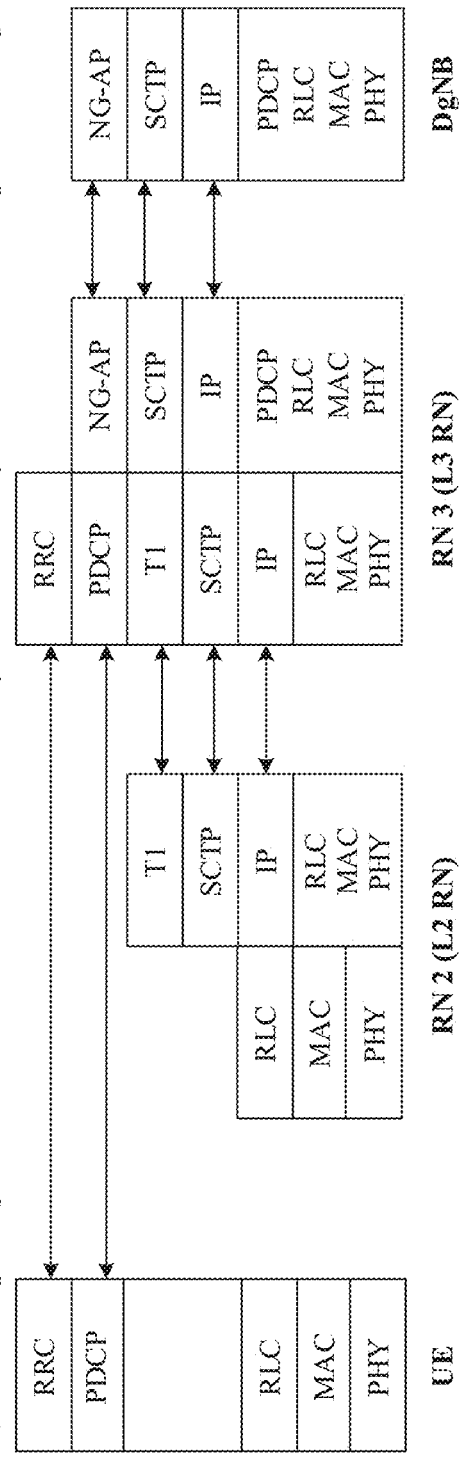

In this embodiment, if a hybrid networking scenario in which a layer 2 relay and a layer 3 relay are used is considered, that is, if the RN 3 uses a layer 3 architecture and the RN 1 (RN 2) uses a layer 2 architecture in FIG. 8, a corresponding multi-hop user plane and control plane protocol architecture are shown in FIG. 9. For ease of description, an interface between relay nodes in FIG. 9 is represented by Un. However, a name of the interface between the relay nodes is not limited in the present invention.

In a possible design, if the UE uses the PDCP PDU to carry the flow control feedback information, after receiving the PDCP PDU, the RN 2 may send the PDCP PDU of the UE to the RN 3 through a GTP tunnel corresponding to a UE DRB used for receiving the PDCP PDU, where the PDCP PDU is encapsulated in a GTP PDU, then mapped to a radio bearer of the RN 2, and sent to the RN 3. Alternatively, the PDCP PDU that carries the flow control feedback information is processed by the RN 2 on an adaptation layer, then mapped to a radio bearer of the RN 2, and sent to the RN 3. The processing on the adaptation layer includes adding adaptation information and performing QoS mapping. The adaptation information includes at least one of the following information: an identifier of a radio bearer (for example, a data radio bearer DRB or a signaling radio bearer SRB of the UE) of the UE, an identifier of the UE, an ID of a PDU session of the UE, an ID of a QoS flow of the UE, or an identifier of a destination node. The QoS mapping is that the RN 2 maps, according to a specific mapping rule (for example, mapping from a DRB/an SRB/a logical channel on a Uu interface to a DRB/an SRB/a logical channel on the Un interface), the PDCP PDU from a radio bearer or a logical channel that is on the Uu interface and that is used for receiving the PDCP PDU or an identifier (for example, a differentiated services code point DSCP) indicating a QoS requirement in the PDCP PDU onto the bearer on the Un interface (for example, an RN 2 DRB) between the RN 2 and the RN 3, and sends the PDCP PDU to the RN 3. The mapping rule may be generated by a core network element or a donor base station DgNB and then sent to the RN 2. Alternatively, the mapping rule may be a mapping rule locally generated by the RN 2 based on information such as a QoS parameter configuration corresponding to a DRB/QoS flow of the UE and a QoS parameter configuration of a DRB of the RN 2, where the information is received from a core network element or a donor base station DgNB or a parent node of the RN 2.

In another possible design, if the UE sends the flow control feedback information by using the control layer RRC message, the RRC message from the UE may be carried by the RN 2 in a T protocol layer message and sent to the RN 3. For example, an RRC container is set in the T1 protocol layer message, used to carry the RRC message from the UE or an RRC message sent to the UE. Alternatively, the RRC message from the UE may be sent to the RN 3 or the DgNB by using a radio bearer (a DRB or an SRB of the RN 2) of the RN 2 after the RN 2 processes the RRC message on the adaptation layer. The processing on the adaptation layer includes adding adaptation information and performing QoS mapping, where the adaptation information includes at least one of the following information: an identifier of a radio bearer of the UE (for example, an ID of an SRB used by the RN 2 to receive the RRC message from the UE), an identifier of the UE, an ID of a PDU session of the UE, an ID of a QoS flow of the UE, or an identifier of a destination node. The QoS mapping is that the RN 2 maps, according to a specific mapping rule (for example, mapping from an SRB/a logical channel on a Uu interface to a DRB/an SRB/a logical channel on the Un interface), the RRC message from a bearer/a logical channel that is on a Uu interface and that is used for receiving the RRC message carrying the flow control feedback information or an identifier indicating a QoS requirement in a data packet that includes the RRC message onto a radio bearer (for example, an RN 2 SRB) between the RN 2 and the RN 3, and sends the RRC message to the RN 3. The mapping rule may be generated by a core network element or a donor base station DgNB and then sent to the RN 2. Alternatively, the mapping rule may be a mapping rule locally generated by the RN 2 based on information such as a QoS parameter configuration corresponding to a DRB/QoS flow of the UE and a QoS parameter configuration of a DRB of the RN 2, where the information is received from a core network element or a donor base station DgNB or a parent node of the RN 2.

It should be noted that FIG. 9 is only a schematic diagram of a possible multi-hop user plane and control plane protocol architecture. For example, when the relay node has more than one hop, a node (or an anchor) on a peer layer of an RRC/PDCP layer of the UE may be in the DgNB, or in the RN serving the UE, or in any RN on the backhaul link. This is not specifically limited in this application.

Based on the foregoing solution, the UE sends, by using the PDCP PDU or the RRC message, the flow control feedback information to a node on a peer layer of a PDCP/RRC protocol stack of the UE. The foregoing solution may be used as a supplement to a solution in which the relay node sends the flow control feedback information, and is a feedback information sending solution provided when the relay node has no feedback channel.

Figure 10:
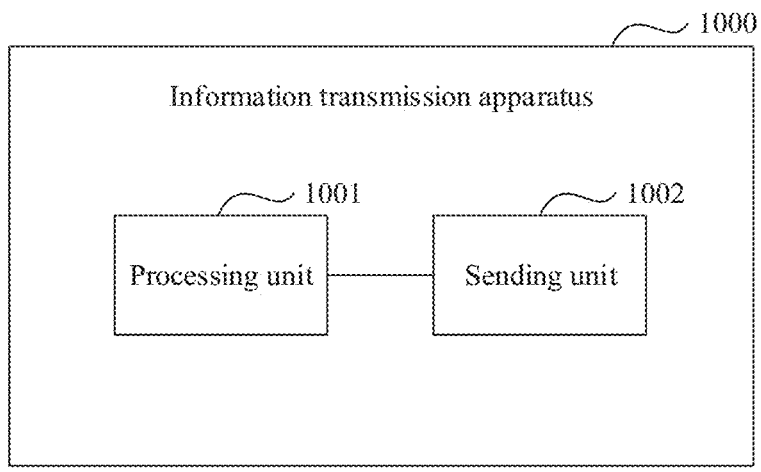
FIG. 10 is a first schematic structural diagram of an information transmission apparatus according to an embodiment of this application.

Based on the foregoing embodiments, an embodiment of this application provides an information transmission apparatus, applied to a relay node and configured to implement an execution process of the relay node in the foregoing method embodiments. Referring to FIG. 10, an information transmission apparatus 1000 includes a processing unit 1001 and a sending unit 1002, where the processing unit 1001, configured to determine first information, where the first information includes at least one of the following information: a buffer status at a granularity of the relay node, a buffer status at a granularity of a radio bearer RB between the relay node and at least one first node, a buffer status at a granularity of each first node in the at least one first node, and a buffer status at a granularity of an RB between each first node in the at least one first node and a child node, where the at least one first node is a child node of the relay node; and the sending unit 1002, configured to send a first packet that carries the first information to a second node.

Optionally, the processing unit 1001 is specifically configured to:

monitor a buffer status of the relay node, to obtain the buffer status at the granularity of the relay node, the buffer status at the granularity of the radio bearer RB between the relay node and the at least one first node, and the buffer status at the granularity of each first node in the at least one first node; or receive a second packet sent by the at least one first node, to obtain the buffer status at the granularity of each first node in the at least one first node and the buffer status at the granularity of the RB between each first node in the at least one first node and the child node from the second packet; or monitor a buffer status of the relay node, and receive a buffer status sent by the at least one first node, to obtain the buffer status at the granularity of the relay node, the buffer status at the granularity of the radio bearer RB between the relay node and the at least one first node, the buffer status at the granularity of each first node in the at least one first node, and the buffer status at the granularity of the RB between each first node in the at least one first node and the child node.

Optionally, the first packet further includes first indication information, used to indicate that the first packet is a packet including flow control feedback information.

Optionally, the processing unit 1001 is further configured to:

determine, based on the first indication information or a destination address carried in the second packet, that the second node is a destination node that receives the first packet.

Optionally, the first information further includes at least one of a buffer status at a granularity of a DRB of a terminal, a buffer status at a granularity of the terminal, a buffer status at a granularity of a protocol data unit PDU session of the terminal, a buffer status at a granularity of a quality of service flow of the terminal, a link status indication of a link between the relay node and the at least one first node, a sequence number of a data packet successfully sent to the first node or the terminal, a sequence number of a data packet that the relay node determines to be lost or that is not fed back to the second node, link quality information of the link between the relay node and the at least one first node, a bandwidth or a transmission rate at the granularity of the relay node, a bandwidth or a transmission rate at the granularity of the terminal, a bandwidth or a transmission rate at the granularity of the RB of the terminal, a bandwidth or a transmission rate at the granularity of the PDU session of the terminal, a bandwidth or a transmission rate at the granularity of the quality of service flow of the terminal, an average or minimum transmission delay of the link between the relay node and the at least one first node, an average wait time or a minimum wait time of data packets at the relay node, and a load degree indication of the relay node.

Optionally, the sending unit 1002 is specifically configured to:

periodically send the first packet to the second node; or send the first packet to the second node when a preset event is triggered.

Optionally, the first packet is sent on a peer general packet radio service tunneling protocol GTP layer, a peer adaptation layer, or a peer control layer between the relay node and the second node.

Optionally, the sequence number of the data packet that the relay node determines to be lost or that is not fed back to the second node belongs to sequence numbers that can be identified at both the second node and the relay node and are consecutively numbered on the link between the second node and the relay node.

Figure 11:
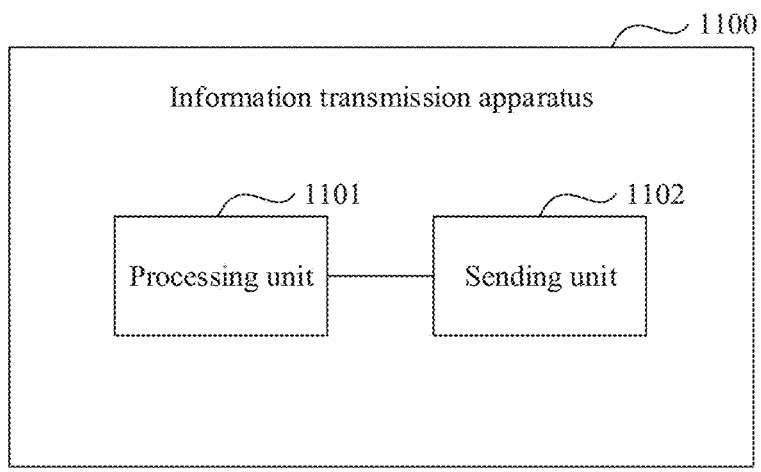
FIG. 11 is a second schematic structural diagram of an information transmission apparatus according to an embodiment of this application.

Based on the foregoing embodiments, an embodiment of this application provides an information transmission apparatus, applied to a terminal and configured to implement an execution process of the terminal in the foregoing method embodiments. Referring to FIG. 11, an information transmission apparatus 1100 includes a processing unit 1101 and a sending unit 1102, where the processing unit 1101, configured to determine first information, where the first information includes at least one of the following information: a link status indication of an access link of the terminal, a sequence number of a data packet received by the terminal device, a sequence number of a data packet that the terminal device determines to be lost or that is not successfully received by the terminal device, link quality information of the access link of the terminal, and an average or minimum transmission delay of the access link of the terminal; and the sending unit 1102, configured to send a first packet that carries the first information to a destination node.

It should be understood that division of the foregoing units is merely logical function division. During actual implementation, all or some of the units may be integrated into one physical entity, or may be physically separated. In addition, all the units may be implemented in a form of software invoked by a processing element, or may be implemented in a form of hardware: or some units may be implemented in a form of software invoked by a processing element, and some units may be implemented in a form of hardware. For example, the processing unit may be a separately disposed processing element, may be implemented by being integrated into a chip, or may be stored in a memory in a form of a program, and a processing element invokes and executes a function of the unit. Implementation of other units is similar. In addition, some or all of the units may be integrated together, or the units may be implemented independently. The processing element may be an integrated circuit and has a signal processing capability. In an implementation process, steps in the foregoing methods or the foregoing units can be implemented by using a hardware integrated logical circuit or instructions in a form of software in a processor element. In addition, the receiving unit is a unit configured to control receiving, and may receive information by using a receiving apparatus of a terminal device or a network device, for example, an antenna or a radio frequency apparatus. The sending unit is a unit configured to control sending, and may send information by using a sending apparatus of a terminal device or a network device, for example, an antenna or a radio frequency apparatus.

For example, the units may be one or more integrated circuits configured to implement the foregoing methods, for example, one or more application-specific integrated circuits (ASIC), one or more digital signal processors (DSP), or one or more field programmable gate arrays (FPGA). For another example, when one of the foregoing units is implemented by scheduling a program by a processing element, the processing element may be a general purpose processor, for example, a central processing unit (CPU) or another processor that can invoke a program. For still another example, the units may be integrated and implemented in a form of a system-on-a-chip (SOC).

Figure 12:
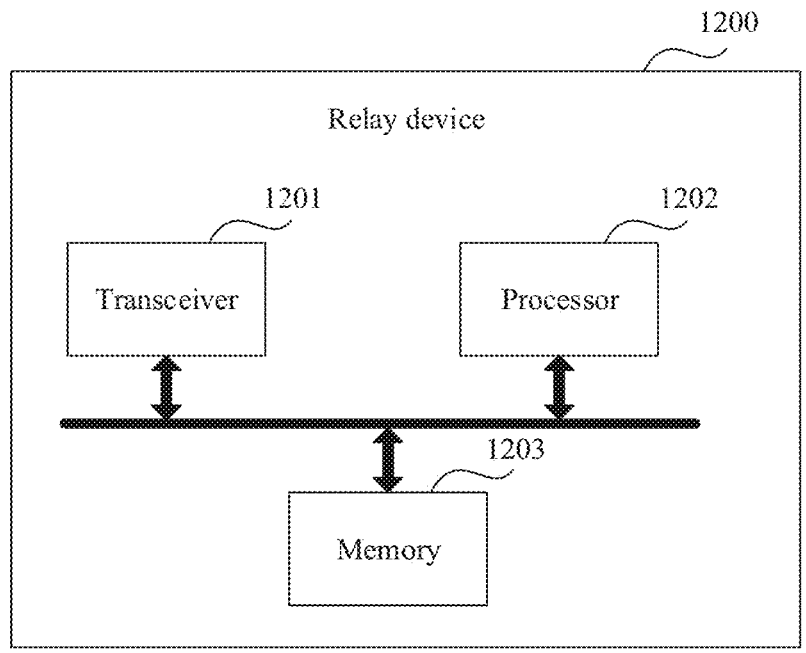
FIG. 12 is a schematic structural diagram of a relay device according to an embodiment of this application.

Based on the foregoing embodiments, an embodiment of this application further provides a relay device, configured to implement an execution process of the relay node in the foregoing method embodiments. Referring to FIG. 12, the relay device 1200 includes a transceiver 1201, a processor 1202, and a memory 1203.

The memory 1203 is configured to store a computer-executable instruction. When the processor 1202 executes the computer-executable instruction, the relay device 1200 is enabled to perform the method shown in FIG. 2.

It may be understood that the information transmission apparatus in the embodiment shown in FIG. 10 may be implemented by the relay device 1200 shown in FIG. 12. A structure of the relay device 1200 does not constitute a limitation on this embodiment of this application.

Figure 13:
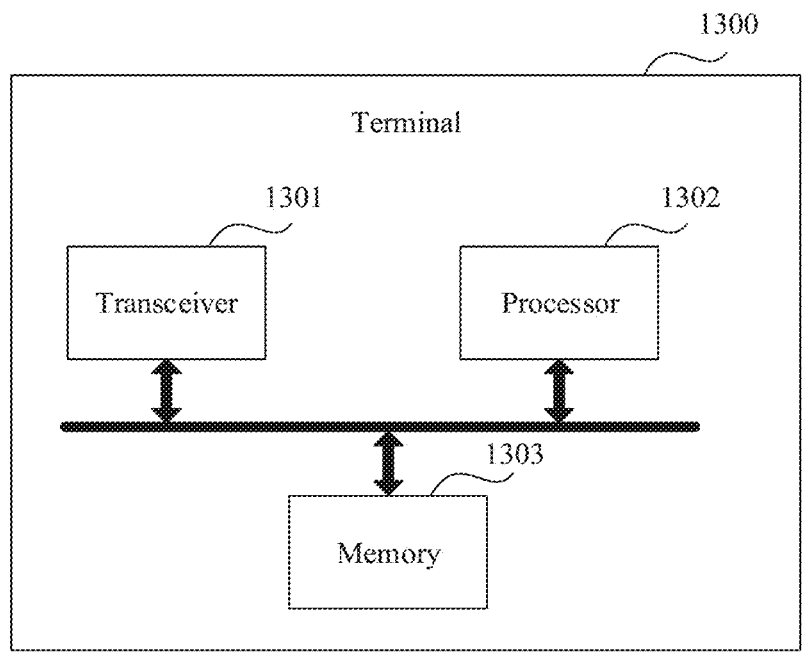
FIG. 13 is a schematic structural diagram of a terminal according to an embodiment of this application.

Based on the foregoing embodiments, this application further provides a terminal. As shown in FIG. 13, the terminal 1300 includes a transceiver 1301, a processor 1302, and a memory 1303.

The memory 1303 is configured to store a computer-executable instruction.

The processor 1302 is configured to determine first information, where the first information includes at least one of the following information: a link status indication of an access link of the terminal, a sequence number of a data packet received by the terminal device, a sequence number of a data packet that the terminal device determines to be lost or that is not successfully received by the terminal device, link quality information of the access link of the terminal, and an average or minimum transmission delay of the access link of the terminal.

When the processor 1302 executes the computer-executable instruction, the transceiver 1301 is configured to send a first packet that carries the first information to a destination node. It may be understood that the information transmission apparatus in the embodiment shown in FIG. 11 may be implemented by the terminal 1300 shown in FIG. 13. A structure of the terminal 1300 does not constitute a limitation on this embodiment of this application.

In the foregoing FIG. 12 and FIG. 13, the processor may be a central processing unit (CPU), a network processor (NP), a hardware chip, or any combination thereof. The memory may include a volatile memory, for example, a random access memory (RAM); or may include a non-volatile memory, for example, a read-only memory (ROM), a flash memory, a hard disk (HDD), or a solid-state drive (SSD); or may include a combination of the foregoing types of memories.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

A person skilled in the art can make various modifications and variations to the embodiments of this application without departing from the spirit and scope of this application. In this way, this application is intended to cover these modifications and variations provided that these modifications and variations of the embodiments of this application fall within the scope of the claims and their equivalent technologies of this application.

What is claimed is:

1. An information transmission method, comprising:
determining, by a relay node, first information, wherein the first information comprises at least one of the following information: a buffer status at a granularity of the relay node, a buffer status at a granularity of a radio bearer (RB) between the relay node and at least one first node, a buffer status at a granularity of each first node in the at least one first node, or a buffer status at a granularity of an RB between each first node in the at least one first node and a child node, and wherein the at least one first node is a child node of the relay node; and
sending, by the relay node, a first packet that carries the first information to a second node,
wherein the first information further comprises at least one of:
a buffer status at a granularity of a radio bearer (RB) of a terminal, a buffer status at a granularity of the terminal, a buffer status at a granularity of a protocol data unit (PDU) session of the terminal, a buffer status at a granularity of a quality of service flow of the terminal, a link status indication of a link between the relay node and the at least one first node, a sequence number of a data packet successfully sent to the first node or the terminal, a sequence number of a data packet that the relay node determines to be lost or that is not fed back to the second node, link quality information of the link between the relay node and the at least one first node, a bandwidth or a transmission rate at the granularity of the relay node, a bandwidth or a transmission rate at the granularity of the terminal, a bandwidth or a transmission rate at the granularity of the RB of the terminal, a bandwidth or a transmission rate at the granularity of the PDU session of the terminal, a bandwidth or a transmission rate at the granularity of the quality of service flow of the terminal, an average or minimum transmission delay of the link between the relay node and the at least one first node, an average wait time or a minimum wait time of data packets at the relay node, or a load degree indication of the relay node.

2. The method according to claim 1, wherein the determining, by a relay node, first information comprises:
monitoring, by the relay node, a buffer status of the relay node to obtain the buffer status at the granularity of the relay node, the buffer status at the granularity of the radio bearer RB between the relay node and the at least one first node, and the buffer status at the granularity of each first node in the at least one first node.

3. The method according to claim 1, wherein the determining, by a relay node, first information comprises:
receiving, by the relay node, a second packet sent by the at least one first node to obtain the buffer status at the granularity of each first node in the at least one first node and the buffer status at the granularity of the RB between each first node in the at least one first node and the child node from the second packet.

4. The method according to claim 1, wherein the determining, by a relay node, first information comprises:
monitoring, by the relay node, a buffer status of the relay node; and receiving a buffer status sent by the at least one first node to obtain the buffer status at the granularity of the relay node, the buffer status at the granularity of the radio bearer (RB) between the relay node and the at least one first node, the buffer status at the granularity of each first node in the at least one first node, and the buffer status at the granularity of the RB between each first node in the at least one first node and the child node.

5. The method according to claim 1, wherein the first packet further comprises first indication information used to indicate that the first packet is a packet comprising flow control feedback information.

6. The method according to claim 5, wherein before the sending, by the relay node, a first packet to the second node, the method further comprises:
determining, by the relay node based on the first indication information or a destination address carried in a second packet, that the second node is a destination node that receives the first packet.

7. The method according to claim 1, wherein the sending, by the relay node, a first packet that carries the first information to the second node comprises:
periodically sending, by the relay node, the first packet to the second node; or
sending, by the relay node, the first packet to the second node when a preset event is triggered.

8. The method according to claim 7, wherein the first packet is sent on a peer general packet radio service tunneling protocol (GTP) layer, a peer adaptation layer, or a peer control layer between the relay node and the second node.

9. The method according to claim 1, wherein the sequence number of the data packet that the relay node determines to be lost or that is not fed back to the second node belongs to sequence numbers that are identified at both the second node and the relay node and that are consecutively numbered on the link between the second node and the relay node.

10. An information transmission apparatus applied to a relay node, wherein the apparatus comprises at least one processor and a memory having instructions, wherein the instructions are executed by the at least one processor to instruct the apparatus to:
determine first information, wherein the first information comprises at least one of the following information: a buffer status at a granularity of the relay node, a buffer status at a granularity of a radio bearer RB between the relay node and at least one first node, a buffer status at a granularity of each first node in the at least one first node, or a buffer status at a granularity of an RB between each first node in the at least one first node and a child node, and wherein the at least one first node is a child node of the relay node; and
send a first packet that carries the first information to a second node,
wherein the first information further comprises at least one of:
a buffer status at a granularity of a RB of a terminal, a buffer status at a granularity of the terminal, a buffer status at a granularity of a protocol data unit (PDU) session of the terminal, a buffer status at a granularity of a quality of service flow of the terminal, a link status indication of a link between the relay node and the at least one first node, a sequence number of a data packet successfully sent to the first node or the terminal, a sequence number of a data packet that the relay node determines to be lost or that is not fed back to the second node, link quality information of the link between the relay node and the at least one first node, a bandwidth or a transmission rate at the granularity of the relay node, a bandwidth or a transmission rate at the granularity of the terminal, a bandwidth or a transmission rate at the granularity of the RB of the terminal, a bandwidth or a transmission rate at the granularity of the PDU session of the terminal, a bandwidth or a transmission rate at the granularity of the quality of service flow of the terminal, an average or minimum transmission delay of the link between the relay node and the at least one first node, an average wait time or a minimum wait time of data packets at the relay node, or a load degree indication of the relay node.

11. The apparatus according to claim 10, wherein the instructions are executed by the at least one processor to further instruct the apparatus to:
monitor a buffer status of the relay node to obtain the buffer status at the granularity of the relay node, the buffer status at the granularity of the radio bearer RB between the relay node and the at least one first node, and the buffer status at the granularity of each first node in the at least one first node.

12. The apparatus according to claim 10, wherein the instructions are executed by the at least one processor to further instruct the apparatus to:
receive a second packet sent by the at least one first node to obtain the buffer status at the granularity of each first node in the at least one first node and the buffer status at the granularity of the RB between each first node in the at least one first node and the child node from the second packet.

13. The apparatus according to claim 10, wherein the instructions are executed by the at least one processor to further instruct the apparatus to:
monitor a buffer status of the relay node; and
receive a buffer status sent by the at least one first node to obtain the buffer status at the granularity of the relay node, the buffer status at the granularity of the radio bearer (RB) between the relay node and the at least one first node, the buffer status at the granularity of each first node in the at least one first node, and the buffer status at the granularity of the RB between each first node in the at least one first node and the child node.

14. The apparatus according to claim 10, wherein the first packet comprises first indication information used to indicate that the first packet is a packet comprising flow control feedback information.

15. The apparatus according to claim 14, wherein the instructions are executed by the at least one processor to further instruct the apparatus to:
determine, based on the first indication information or a destination address carried in a second packet, that the second node is a destination node that receives the first packet.

16. The apparatus according to claim 10, wherein the instructions are executed by the at least one processor to further instruct the apparatus to:
periodically send the first packet to the second node; or
send the first packet to the second node when a preset event is triggered.

17. The apparatus according to claim 16, wherein the first packet is sent on a peer general packet radio service tunneling protocol (GTP) layer, a peer adaptation layer, or a peer control layer between the relay node and the second node.

18. The apparatus according to claim 10, wherein the sequence number of the data packet that the relay node determines to be lost or that is not fed back to the second node belongs to sequence numbers that can be identified at both the second node and the relay node and that are consecutively numbered on the link between the second node and the relay node.

\* \* \* \* \*